US008710405B2

(12) United States Patent
Inoue et al.

(10) Patent No.: US 8,710,405 B2
(45) Date of Patent: Apr. 29, 2014

(54) AUSTENITIC STAINLESS STEEL WELDING WIRE AND WELDING STRUCTURE

(75) Inventors: Hiroshige Inoue, Kimitsu (JP); Ryuichi Honma, Futtsu (JP); Manabu Mizumoto, Kisarazu (JP); Yuusuke Oikawa, Hikari (JP); Ryo Matsuhashi, Yokosuka (JP); Shinji Tsuge, Hikari (JP); Shigeo Fukumoto, Shunan (JP)

(73) Assignee: Nippon Steel & Sumikin Stainless Steel Corporation, Tokyo (JP)

( * ) Notice: Subject to any disclaimer, the term of this patent is extended or adjusted under 35 U.S.C. 154(b) by 1978 days.

(21) Appl. No.: 11/404,413

(22) Filed: Apr. 13, 2006

(65) Prior Publication Data

US 2006/0243719 A1 Nov. 2, 2006

(30) Foreign Application Priority Data

| Apr. 15, 2005 | (JP) | P2005-118480 |
| Apr. 15, 2005 | (JP) | P2005-118609 |
| Jul. 10, 2005 | (JP) | P2005-294585 |
| Oct. 7, 2005 | (JP) | P2005-294584 |
| Nov. 10, 2005 | (JP) | P2005-295798 |

(51) Int. Cl.
*B23K 35/34* (2006.01)
*B23K 35/22* (2006.01)

(52) U.S. Cl.
USPC ................................... 219/146.41; 219/146.1

(58) Field of Classification Search
USPC ............... 219/146.41, 146.1, 145.23, 146.23, 219/146.22, 146.31, 146.32
See application file for complete search history.

(56) References Cited

U.S. PATENT DOCUMENTS

| 3,492,117 | A | * | 1/1970 | Jackson et al. ............. 420/586.1 |
| 3,547,625 | A | * | 12/1970 | Bieber et al. .................... 420/38 |
| 4,443,406 | A | * | 4/1984 | Sukekawa et al. ......... 420/586.1 |
| 4,487,744 | A | * | 12/1984 | DeBold et al. ................ 420/582 |
| 4,911,886 | A | * | 3/1990 | Pitler et al. .................... 420/586 |
| 5,489,757 | A | * | 2/1996 | Schuermann et al. ........ 219/110 |
| 5,670,071 | A | * | 9/1997 | Ueyama et al. .......... 219/130.51 |

(Continued)

FOREIGN PATENT DOCUMENTS

| EP | 566814 A1 * | 10/1993 | ............. C22C 38/42 |
| JP | 58205696 | 11/1983 | |
| JP | 62068696 | 3/1987 | |
| JP | 01095895 | 4/1989 | |
| JP | 03086392 | 4/1991 | |
| JP | 04006215 | 1/1992 | |
| JP | 04006216 | 1/1992 | |
| JP | 08071784 A * | 3/1996 | |
| JP | 2002113592 A * | 4/2002 | |

OTHER PUBLICATIONS

Onzawa et al., "Effect of Reheating on Low Temperature Toughness of Type 316L Weld Metal", Journal of the Japan Welding Society, vol. 5, 1987, pp. 262-268.

D.T. Read et al., "Metallurgical Factors Affecting the Toughness of 316L SMA Weldments at Cryogenic Temperatures", Welding Journal, vol. 59, 1980, pp. 104s-113s.

Primary Examiner — Henry Yuen
Assistant Examiner — Hemant Mathew
(74) Attorney, Agent, or Firm — Dorsey & Whitney LLP

(57) ABSTRACT

A welding wire for austenitic stainless steel welding contains, in percent by mass, C: 0.005 through 0.05%, Si: 0.1 through 1.0%, Mn: 1.0 through 3.5%, Cr: 25.0 through 28.0%, Ni: 16.0 through 23.9%, Mo: 1.6 through 3.0%, Cu: 0.1 through 0.5%, Al: 0.001 through 0.02%, and N: more than 0.30 through 0.50%, limiting O to 0.03% or less, P to 0.03% or less, and S to 0.005% or less, and having a ratio of a Cr equivalent to Ni equivalent (Cr equivalent/Ni equivalent) within a range between 0.85 and 1.2 and a PI value of 35 or more, the remainder being iron and unavoidable impurities.

22 Claims, 6 Drawing Sheets

(56) References Cited

U.S. PATENT DOCUMENTS

| | | | |
|---|---|---|---|
| 5,849,111 A * | 12/1998 | Igarashi et al. | 148/325 |
| 6,159,310 A * | 12/2000 | Inoue et al. | 148/325 |
| 6,528,012 B2 * | 3/2003 | Nishimoto et al. | 420/94 |
| 6,911,268 B2 * | 6/2005 | Takada et al. | 428/659 |
| 2001/0030221 A1 * | 10/2001 | Ogawa et al. | 228/101 |
| 2002/0011287 A1 * | 1/2002 | Nishimoto et al. | 148/336 |
| 2003/0049153 A1 * | 3/2003 | Martin et al. | 420/38 |
| 2003/0138342 A1 * | 7/2003 | Hirasawa et al. | 420/38 |
| 2004/0055667 A1 * | 3/2004 | Takada et al. | 148/533 |
| 2005/0053513 A1 * | 3/2005 | Pike, Jr. | 420/445 |
| 2006/0065327 A1 * | 3/2006 | Buck | 148/325 |

* cited by examiner

Cr EQUIVALENT = Cr+Mo+1.5×Si
Ni EQUIVALENT = Ni+0.5×Mn+30×C+19.5×N
0.30<N≦0.50

Cr EQUIVALENT = Cr+Mo+1.5×Si
Ni EQUIVALENT = Ni+0.5×Mn+30×C+30×N
N≦0.30

Cr EQUIVALENT = Cr+Mo+1.5×Si
Ni EQUIVALENT = Ni+0.5×Mn+30×C+19.5×N
0.30<N≦0.50

Cr EQUIVALENT = Cr+Mo+1.5×Si
Ni EQUIVALENT = Ni+0.5×Mn+30×C+30×N
N≦0.30

AUSTENITIC STAINLESS STEEL WELDING WIRE AND WELDING STRUCTURE

CROSS REFERENCE TO RELATED APPLICATION(S)

The present application claims priority from Japanese Patent Application Nos. 2005-118480, 2005-118609, 2005-295584, 2005-295585 and 2005-295, filed Apr. 15, 2005, Apr. 15, 2005, Oct. 7, 2005, Jul. 10, 2005 and Nov. 10, 2005, respectively, under 35 U.S.C. §119. The entire disclosures and content of these patent applications are incorporated herein by reference.

FIELD OF THE INVENTION

The present invention relates to a highly corrosion-resistant austenitic stainless steel welding wire and a welding structure to be used under marine and coastal environments and chloride environments, and more particularly, to a highly corrosion-resistant austenitic stainless steel welding wire and a welding structure by which weld metals excellent in corrosion resistance and crevice corrosion resistance in seawater environment and excellent in low-temperature toughness are obtained when assembling a hull, a bulkhead, a framework, a hydrofoil, etc., of a hull structure by welding of stainless steel.

BACKGROUND INFORMATION

Generally, austenitic stainless steel is used in an environment in which corrosion resistance is preferred and possible required, and known examples regulated in JIS are SUS304, SUS316 and SUS317 containing a large amount of Ni and Mo for improvement of corrosion resistance against non-oxygenated acid, and SUS304L, SUS316L, and SUS317L, whose C contents are reduced to improve the grain boundary corrosion resistance, and these types of steels are selected and used according to a corrosive environment.

As welding wires to be used for welding these austenitic stainless steels, the wire for austenitic stainless steel regulated in JIS Z 3321 and the flux-cored wire for austenitic stainless steel regulated in JIS Z 3323 are used in many cases. In addition, flux-cored wires for 308, 316, 308L, and 316L austenitic stainless steels are also used (for example, refer to Japanese Unexamined Patent Application, First Publication No. S58-205696, and Japanese Unexamined Patent Application, First Publication No. S62-68696).

On the other hand, for a hull structure, coated steel plates to which a heavy-duty coating is applied are conventionally used; however, for example, in the usage as a hydrofoil, etc., of a high-speed vessel, high-velocity seawater current comes into contact therewith, so that a high-strength material of an austenitic stainless steel which has excellent seawater corrosion resistance and which does not require coating has been proposed (for example, refer to Japanese Patent Publication No. 2783895 and Japanese Patent Publication No. 2783896).

In addition, for example, highly corrosion-resistant stainless steels such as SUS836L and SUS890L, etc., which contain Cr, Mo, Cu, and N to particularly increase the seawater corrosion resistance and whose pitting corrosion resistance and crevice corrosion resistance are improved by increasing the Mo and N contents compared with those conventionally used, have been developed.

As a welding material to be used when welding these highly corrosion-resistant stainless steels and high seawater corrosion resistance stainless steels, there are proposed a high Mo-high N-based TIG and plasma welding wire for highly corrosion-resistant stainless steel welding, containing Mo: 6.0 through 7.0%, N, 0.25 through 0.50%, Cr: 21.5 through 25.0%, Ni: 17.5 through 20%, and Cu: 0.5 through 1.0% (for example, refer to Japanese Unexamined Patent Application, First Publication No. H01-95895), and a high Mo-high N-based flux-cored wire for highly corrosion-resistant stainless steel welding, containing Mo: 2.7 through 6.7%, N, 0.05 through 0.30%, Cr: 18.6 through 28.9%, Ni: 12.7 through 27.3%, and Cu: 0.8 through 2.4% (for example, refer to Japanese Unexamined Patent Application, First Publication No. H03-86392).

In some cases, a highly corrosion-resistant stainless steel is welded by using a high Cr-high Mo-based Ni alloy wire of Inconel 625 (60Ni-22Cr-9Mo-3.5Nb), etc., without using these common metal welding wires.

When welding a highly corrosion-resistant stainless steel by using the above-described high Mo-high N-based welding wire and high Cr-high Mo-based Ni alloy wire, sufficient seawater corrosion resistance of the weld metal is secured. However, a brittle phase such as a sigma phase is deposited in the weld metal due to a heat cycle caused by welding and significantly lowers the toughness of the weld metal, and in particular, this problem becomes apparent as the Mo content in the wire increases (for example, refer to Onzawa, et. al., Quarterly Journal of the Japan Welding Society Vol. 5 (1987), pp. 262-268).

Generally, in terms of weldability, that is, in terms of prevention of high-temperature solidification cracks of weld metals, components of these welding wires for austenitic stainless steel are designed so that weld metal containing approximately several through ten percent of a ferrite phase in terms of a volume ratio in a welding composition can be obtained by welding. However, weld metal containing a ferrite phase in its weld metal composition becomes lower in low-temperature toughness than a single austenite phase weld metal, and according to an increase in the ferrite amount, this problem becomes apparent (for example, refer to D. T. Read et. al.; Welding Journal, Vol. 59 (1980), pp. 104s-113).

On the other hand, in an austenitic stainless steel welding structure to be applied to a hull structure, etc., that is used in seawater environment and is preferred to be safe in the case of hitting a reef or collision of ships, it is demanded that a weld metal excellent in pitting corrosion resistance in seawater environment, excellent in crevice corrosion resistance, and excellent in low-temperature toughness be provided as a weld zone.

SUMMARY OF EXEMPLARY EMBODIMENT OF INVENTION

In view of the problems of the conventional technique described above, one of the objects of the exemplary embodiments of the present invention is to provide a highly corrosion-resistant austenitic stainless steel welding wire and welding structure that can be applied to a hull, a bulkhead, a frame, a hydrofoil, etc., of a hull structure that is preferred to have durability in seawater environment and safety against collision and that includes a base metal and a weld zone that are excellent in pitting corrosion resistance and crevice corrosion resistance in seawater environment and excellent in low-temperature toughness.

The component composition of a weld metal excellent in low-temperature toughness and corrosion resistance in seawater environment by conducting a gas shield arc welding test has been considered by using austenitic stainless steel solid wires and flux-cored wires having various component compositions.

As a result, an effective method may be provided in which, in order to reduce the ferrite phase that harmfully influences the low-temperature toughness in the weld metal to a degree that does not cause high-temperature solidification cracks and to improve the low-temperature toughness of the weld metal, the component composition of the weld metal is set so that the Cr equivalent/Ni equivalent of the weld metal satisfies 0.85 through 1.2, and in order to improve pitting corrosion resistance of the weld metal in seawater environment, the PI value of the weld metal is set to 35 or more.

The exemplary embodiment of the present invention can be provided based on this knowledge, and the summary thereof is as follows.

(1) A welding wire for austenitic stainless steel welding, containing C, 0.005 through 0.05%, Si: 0.1 through 1.0%, Mn: 0.1 through 3.5%, Cr: 25.0 through 28.0%, Ni: 16.0 through 23.9%, Mo: 1.6 through 3.0%, Cu: 0.1 through 0.5%, Al: 0.001 through 0.02%, and N, 0.03 through 0.50% in percent by mass with respect to a total mass of the wire in a solid wire, an outer coat, or an outer coat and a flux, and furthermore, limiting P to 0.03% or less and S to 0.005% or less, and in case of a solid wire, limiting O to 0.03% or less, having a ratio of Cr equivalent to Ni equivalent (Cr equivalent/Ni equivalent) defined by the following equations (A) and (B) within a range between 0.85 and 1.2, a PI value of 35 or more defined by the following (C), the remainder being iron and unavoidable impurities.

$$\text{Cr equivalent}=\text{Cr}+\text{Mo}+1.5'\text{Si} \quad (A)$$

$$\text{Ni equivalent}=\text{Ni}+0.5\text{Mn}+30'\text{C}+30'\text{N (N is 0.03 through 0.30), or}$$

$$\text{Ni equivalent}=\text{Ni}+0.5\text{Mn}+30'\text{C}+19.5'\text{N (N is more than 0.30 and equal to or less than 0.50)} \quad (B)$$

$$\text{PI value}=\text{Cr}+3.3'\text{Mo}+16'\text{N (N is 0.03 through 0.30), or}$$

$$\text{PI value}=\text{Cr}+3.3'\text{Mo}+10.4'\text{N (N is more than 0.30 and equal to or less than 0.50)} \quad (C)$$

Herein, Cr, Mo, Si, Ni, Mn, C, and N described above indicate contents (percent by mass) of the respective components in the welding wire.

(2) The welding wire for austenitic stainless steel welding as set forth in (1), further containing one, two, or more of Ti: 0.01 through 0.3%, Nb: 0.01 through 0.3%, Ca: 0.0005 through 0.0050%, and Mg: 0.0005 through 0.0050% in percent by mass.

(3) An austenitic stainless steel welding structure including austenitic stainless steel base metal containing C, 0.005 through 0.03%, Si: 0.1 through 1.5%, Mn: 0.1 through 3.0%, Ni: 15.0 through 21.0%, Cr: 22.0 through 28.0%, Mo: 1.5 through 3.5%, N, 0.15 through 0.35%, Al: 0.005 through 0.1% or less in percent by mass, limiting O to 0.007% or less, P to 0.05% or less, and S to 0.003% or less, having a PIW value defined by the following equation (D) within a range between 35 and 40, and a δ cal value defined by the following equation (E) within a range between −6 and +4, the remainder being iron and unavoidable impurities, and weld metal that is formed at a weld zone, containing C, 0.005 through 0.05%, Si: 0.1 through 1.0%, Mn: 0.1 through 3.5%, Cr: 25.0 through 28.0%, Ni: 16.0 through 23.9%, Mo: 1.6 through 3.0%, Cu: 0.1 through 0.5%, Al: 0.001 through 0.02%, and N, 0.03 through 0.35% in percent by mass, limiting O to 0.10% or less, P to 0.03% or less, and S to 0.005% or less, having a ratio of a Cr equivalent to an Ni equivalent (Cr equivalent/Ni equivalent) within a range between 0.85 and 1.2 defined by the following equations (F) and (G), having a PI value of 35 or more defined by the following equation (H), the remainder being iron and unavoidable impurities.

$$\text{PIW value}=\text{Cr}+3.3(\text{Mo}+0.5\text{W})+16\text{N} \quad (D)$$

$$\delta \text{ cal value}=2.9(\text{Cr}+0.3\text{Si}+\text{Mo}+0.5\text{W})-2.6(\text{Ni}+0.3\text{Mn}+0.25\text{Cu}+32\text{C}+20\text{N}-18 \quad (E)$$

Herein, Cr, Mo, W, N, Si, Ni, Mn, Cu, and C described above indicate contents (percent by mass) of the respective components in the steel material, and $$\text{Cr equivalent}=\text{Cr}+\text{Mo}+1.5\times\text{Si}. \quad (F)$$

$$\text{Ni equivalent}=\text{Ni}+0.5\times\text{Mn}+30\times\text{C}+30\times\text{N} \quad (G)$$

$$\text{Pi value}=\text{Cr}+3.3\times\text{Mo}+16\times\text{N} \quad (H)$$

Herein, Cr, Mo, Si, Ni, Mn, C, and N described above indicate contents (percent by mass) of the respective components in the weld metal.

(4) The austenitic stainless steel welding structure as set forth in (3), further containing one, two, or more of Cu: 0.1 through 2.0%, Ti: 0.003 through 0.03%, Nb: 0.02 through 0.20%, V: 0.05 through 0.5, and W: 0.3 through 3.0% in percent by mass in the austenitic stainless steel base metal.

(5) The austenitic stainless steel welding structure as set forth in (3) or (4), further containing one, two, or more of Ti: 0.01 through 0.3%, Nb: 0.01 through 0.3%, Ca: 0.0005 through 0.0050%, and Mg: 0.0005 through 0.0050% in percent by mass in the weld metal.

(6) The austenitic stainless steel welding structure as set forth in any one of (3) through (5), wherein the weld metal is formed by using gas shield arc welding or tungsten arc welding.

(7) The austenitic stainless steel welding structure as set forth in (6), wherein the weld metal is formed under welding conditions such that a welding heat input defined by the following equation (I) is 20,000 J/cm or less and a base metal dilution ratio D defined by the following (J) is 30% or less.

$$Q=\text{welding current}\times\text{welding voltage}\times\text{welding time/welding length} \quad (I)$$

$$D=\text{melting volume of base metal/total weld metal volume} \quad (J)$$

(8) The austenitic stainless steel welding structure as set forth in (6) or (7), wherein the weld metal is formed by using pulsed arc under conditions such that a difference between a peak current and a base current is 20 A or more, a duty ratio R defined by the following equation (K) is set to 0.2 through 0.6, and a frequency is set to 10 Hz or more.

$$R=\text{peak current period/(peak current period+base current period)} \quad (K)$$

BRIEF DESCRIPTION OF THE DRAWINGS

Further objects, features and advantages of the invention will become apparent from the following detailed description taken in conjunction with the accompanying figure showing illustrative embodiment(s), result(s) and/or feature(s) of the exemplary embodiment(s) of the present invention, in which.

DETAILED DESCRIPTION OF EXEMPLARY EMBODIMENTS OF INVENTION

Figure 1:
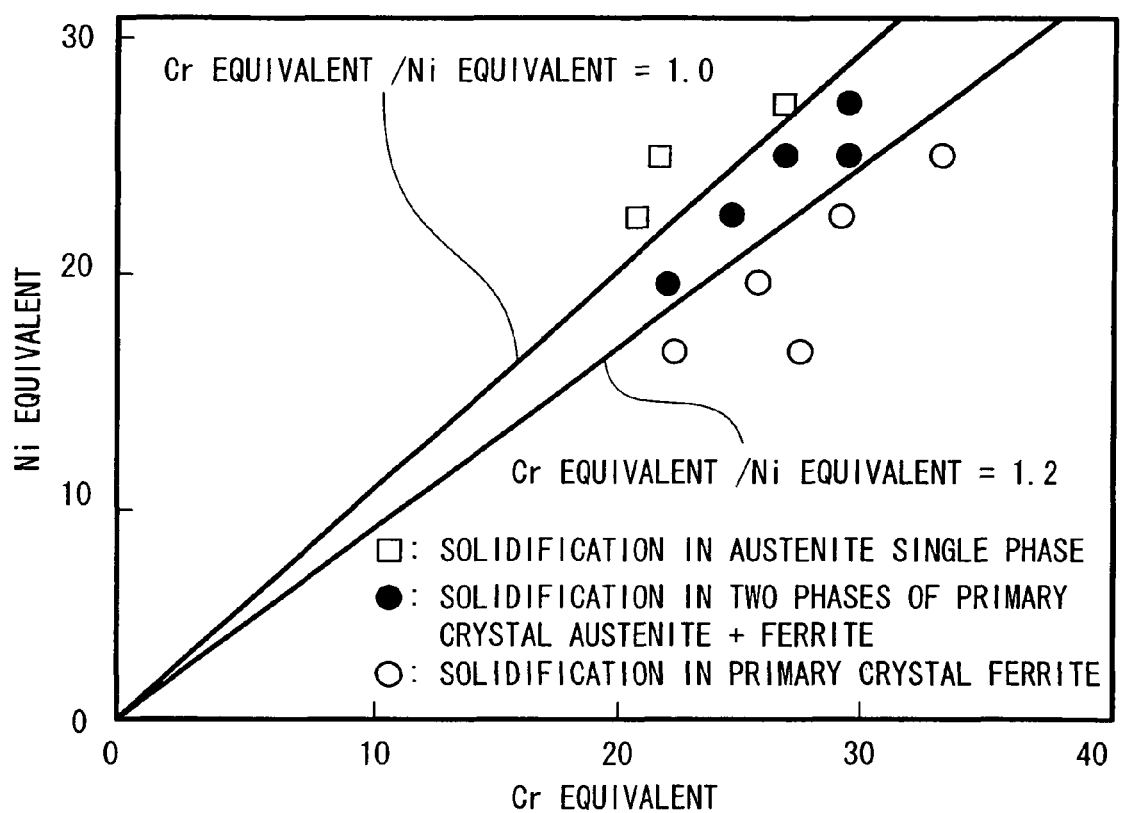
FIG. 1 is a diagram showing a relationship between a Cr equivalent and an Ni equivalent of a weld metal and its solidification morphology when N is more than 0.30 and equal to or less than 0.50%.

Hereinafter, the exemplary embodiment of the present invention will be described in detail. First, a technical idea for improving low-temperature toughness and corrosion resistance in seawater of a weld metal environment and a basic design of welding wire components of the exemplary embodiment of the present invention will be described.

When austenitic stainless steel was welded by a similar composition metal welding wire, the solidification morphology of a weld metal changes according to the wire components as follows, and this significantly influences the weld metal composition at a final room temperature and the low-temperature toughness of the weld metal.

Namely, according to the component composition, the solidification morphology of the weld metal formed at the weld zone is classified into a solidification morphology in which the primary crystal solidified phase becomes an austenite phase or ferrite phase and independently completes solidification and a solidification morphology in which solidification is completed in two phases of a ferrite phase+austenite phase.

Among these, in the solidification morphology of the weld metal in which a primary crystal solidified phase of the weld metal is a ferrite phase and solidification is completed in the single ferrite phase, after solidification, an austenite phase deposits in a needle shape in the process of cooling the weld metal to room temperature; however, the ferrite phase in the weld metal at room temperature finally remains at 20% or more in volume ratio, and as a result, the low-temperature toughness of the weld metal remarkably lowers.

In the solidification morphology of the weld metal in which the primary crystal solidified phase of the weld metal is a ferrite phase, and due to subsequent deposition of an austenite phase, solidification is completed in two phases of the ferrite phase+the austenite phase, and after solidification, in the process of cooling the weld metal to room temperature, the austenite phase grows into the ferrite phase as a dendrite core, whereby the ferrite amount in the weld metal at room temperature is finally reduced to approximately several through 20 percent in volume ratio. However, this ferrite phase in the weld metal links like a network and remains, and when an impact load is applied, cracks propagate via the network-like ferrite phase, so that the low-temperature toughness of the weld metal lowers. In the ferrite phase diminishing in the network form in the weld metal at room temperature, Cr and Mo, etc., are thickened more than at the time of solidification, and brittle intermetallic compounds such as a sigma phase are easily deposited, so that the toughness of the weld metal lowers.

On the other hand, in the solidification morphology of the weld metal in which the primary crystal solidified phase of the weld metal is an austenite phase, and due to subsequent deposition of a ferrite phase, solidification is completed in two phases of the austenite phase+the ferrite phase, and after solidification, the spherical ferrite phase of the composition of the weld metal cooled to room temperature disperses and remains between the austenite dendrites, and the ferrite amount is reduced to several percent or less, so that lowering in low-temperature toughness of the weld metal is less than in the above-described solidification morphology.

In the solidification morphology of the weld metal in which the primary crystal solidified phase of the weld metal is an austenite phase, and then solidification is completed in the single austenite phase, the low-temperature toughness of the weld metal is favorable; however, solidification cracks tend to easily occur in the weld metal when welding.

Based on the above-mentioned finding, the technical concept of the exemplary embodiment of the present invention is, by optimizing the element composition of the welding wire, with suppressing the occurrence of the solidification cracks, achieving the solidification morphology in which the primary crystal solidified phase of a weld metal formed by welding is an austenite phase to decrease a ferrite phase in the welding metal harmful to low-temperature toughness.

In addition, the component system of the welding wire for realizing this technical idea and improving the low-temperature toughness of the weld metal can be regulated by using the following Cr equivalent and Ni equivalent indexes.

Figure 2:
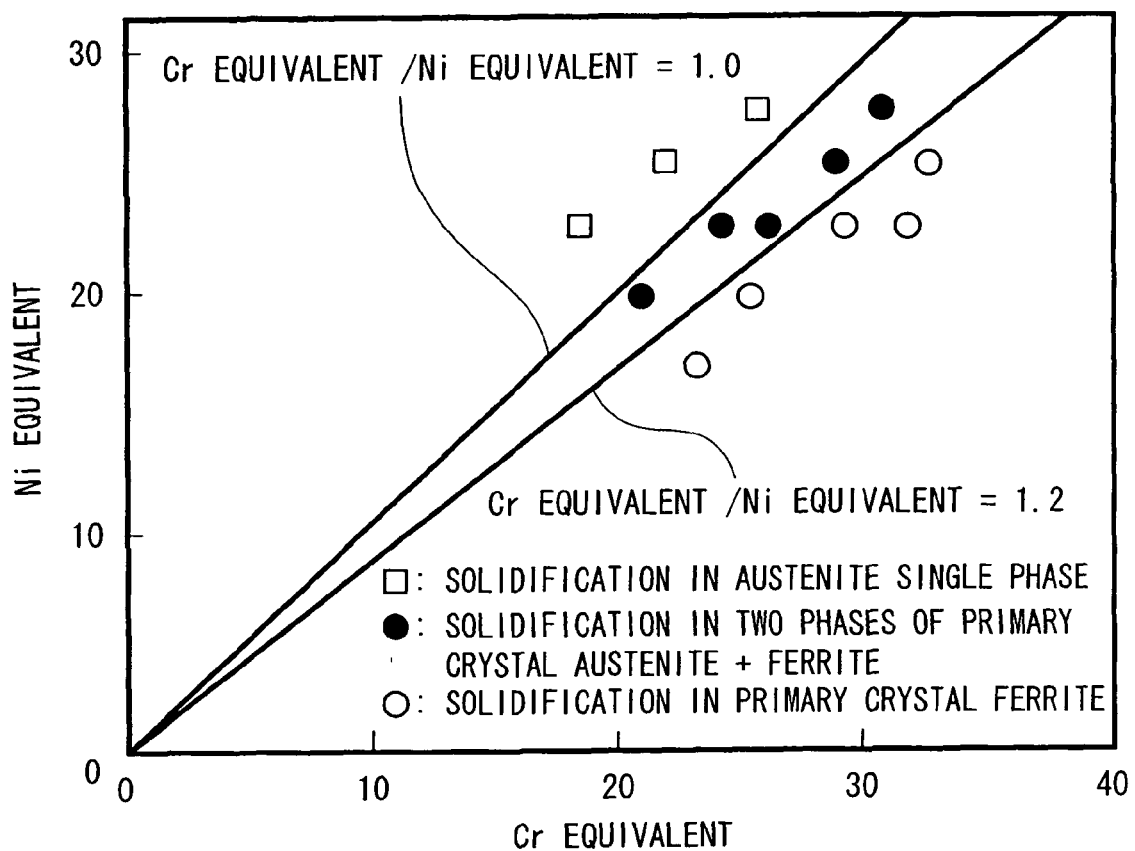
FIG. 2 is a diagram showing a relationship between a Cr equivalent and an Ni equivalent of a weld metal and its solidification morphology when N is equal to or less than 0.30%.
Figure 3:
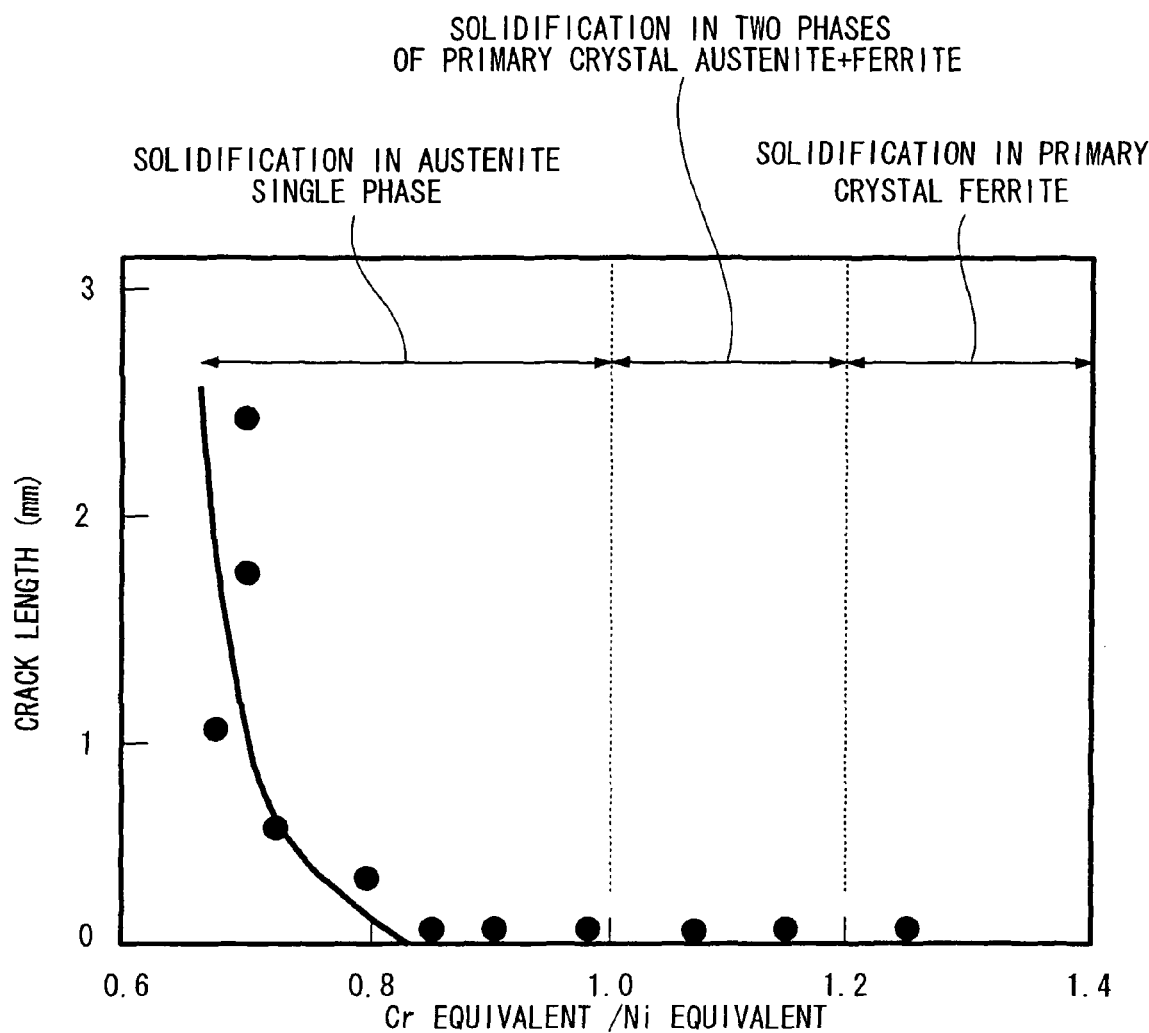
FIG. 3 is a diagram showing a relationship between a solidification crack length of a weld metal and Cr equivalent/Ni equivalent in a varestraint test when N is more than 0.30 and equal to or less than 0.50%.
Figure 4:
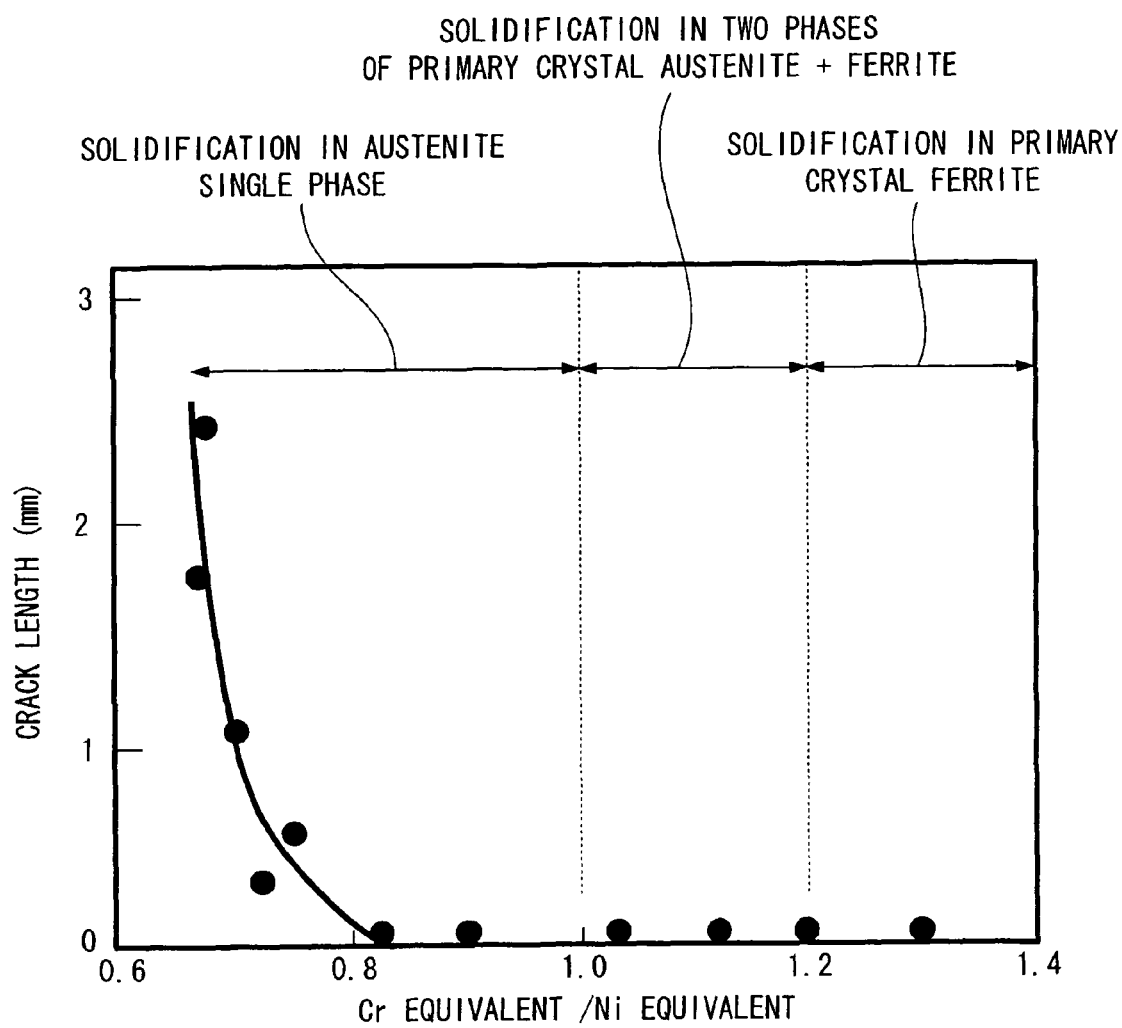
FIG. 4 is a diagram showing a relationship between a solidification crack length of weld metal and Cr equivalent/Ni equivalent in a varestraint test when N is equal to or less than 0.30%.

FIG. 1 and FIG. 2 show the relationship between the Cr equivalent and Ni equivalent of the welding wire and the solidification morphology of the weld metal. FIG. 3 and FIG. 4 show the relationship between a solidification crack length in a varestraint test and the Cr equivalent/Ni equivalent.

Herein, the Cr equivalent and the Ni equivalent of the welding wire are defined by the following equations (A), (B), and (C). The Cr equivalent is an index indicating the degree of contribution of the welding wire components to the formation of the ferrite phase, and the Ni equivalent is an index indicating the degree of contribution of the welding wire components to the formation of the austenite phase.

$$\text{Cr equivalent} = \text{Cr} + \text{Mo} + 1.5 \times \text{Si} \quad (A)$$

$$\text{Ni equivalent} = \text{Ni} + 0.5 \times \text{Mn} + 30 \times \text{C} + 19.5 \times \text{N} \quad (B)$$

Herein, the respective Cr, Mo, Si, Ni, Mn, C, and N indicate contents (percent by mass) of the respective components in the welding wire. Further, N is regulated to more than 0.30 and 0.50% or less.

$$\text{Ni equivalent} = \text{Ni} + 0.5 \times \text{Mn} + 30 \times \text{C} + 30 \times \text{N} \quad (C)$$

Herein, the respective Cr, Mo, Si Ni, Mn, C, and {N} indicate contents (percent by mass) of the respective components in the welding wire. Further, N is regulated to 0.03 through 0.30%. Concerning N, when N of more than 0.30 is added to the wire, a part of this becomes a gas during welding and does not dissolve into the weld metal, so that its coefficient becomes different depending on the amount of dispersion.

From FIG. 1 and FIG. 2, it is confirmed that when the Cr equivalent/Ni equivalent of the welding wire is 1.0 or more and 1.2 or less, the primary crystal solidified phase of the weld metal becomes an austenite phase, and due to subsequent deposition of a ferrite phase, solidification is completed in two phases of the ferrite phase+the austenite phase, and at room temperature the ferrite amount harmful to the low-temperature toughness in the weld metal is reduced, whereby the low-temperature toughness can be improved (shown by the black circles • in FIG. 1 and FIG. 2).

On the other hand, when the Cr equivalent/Ni equivalent of the welding wire exceeds 1.2, the primary crystal solidified phase of the weld metal becomes a ferrite phase, and after this, even if solidification is completed in the single ferrite phase or solidification is completed in two phases of the ferrite phase+austenite phase due to deposition of the austenite phase, the weld metal at room temperature contains a large amount of ferrite phase harmful to the low-temperature toughness, so that the desired low-temperature toughness improvement cannot be realized (shown by white circles ○ in FIG. 1 and FIG. 2). In addition, when the Cr equivalent/Ni equivalent becomes less than 1.0, the primary crystal solidified phase of the weld metal becomes an austenite phase, and thereafter, solidification is completed in the single austenite phase. In this solidification morphology of the weld metal, it is known that the ferrite amount at room temperature harmful to the low-temperature toughness in the weld metal is reduced and the low-temperature toughness of the weld metal becomes favorable; however, solidification cracks tend to easily occur in the weld metal when welding (shown by white squares □ in FIG. 1 and FIG. 2).

However, a Cr equivalent/Ni equivalent of less than 1.0 only regulates the component system just by the difference in the solidification morphology that involves an austenite single phase solidification, and is not related to actual solidification cracks. Therefore, components that do not cause solidification cracks even when reducing the ferrite phase harmful to the low-temperature toughness to its lower limit were earnestly considered. The results of this investigation are shown in FIG. 3 and FIG. 4. Even in the case of a Cr equivalent/Ni equivalent of the weld metal less than 1.0 and an austenite single phase solidification, solidification cracks did not occur when the Cr equivalent/Ni equivalent was 0.85 or more. On the other hand, when the Cr equivalent/Ni equivalent becomes less than 0.85, solidification cracks occur, and as Cr equivalent/Ni equivalent becomes smaller, the solidification crack length becomes longer. Namely, in view of the solidification cracking sensitivity of the weld metal, it was found that solidification cracks do not occur when Cr equivalent/Ni equivalent is 0.85 or more even in the case of components that bring about an austenite single phase solidification.

Therefore, in the exemplary embodiment of the present invention, in order to sufficiently improve the low-temperature toughness of the weld metal by reducing the ferrite phase harmful to the low-temperature toughness in the weld metal while preventing the occurrence of solidification cracks of the weld metal and maintaining favorable weldability, the component composition of the welding wire is regulated so as to satisfy that the ratio of the Cr equivalent and Ni equivalent (Cr equivalent/Ni equivalent) of the welding wire defined by the respective equations (A) through (C) is within the range between 0.85 and 1.2.

In addition, when austenitic stainless steel is welded with a similar composition metal welding wire, concerning pitting corrosion resistance of the weld metal in a corrosive seawater environment, the wire components are regulated by the PI value defined by the following equation (D) and (E).

Figure 5:
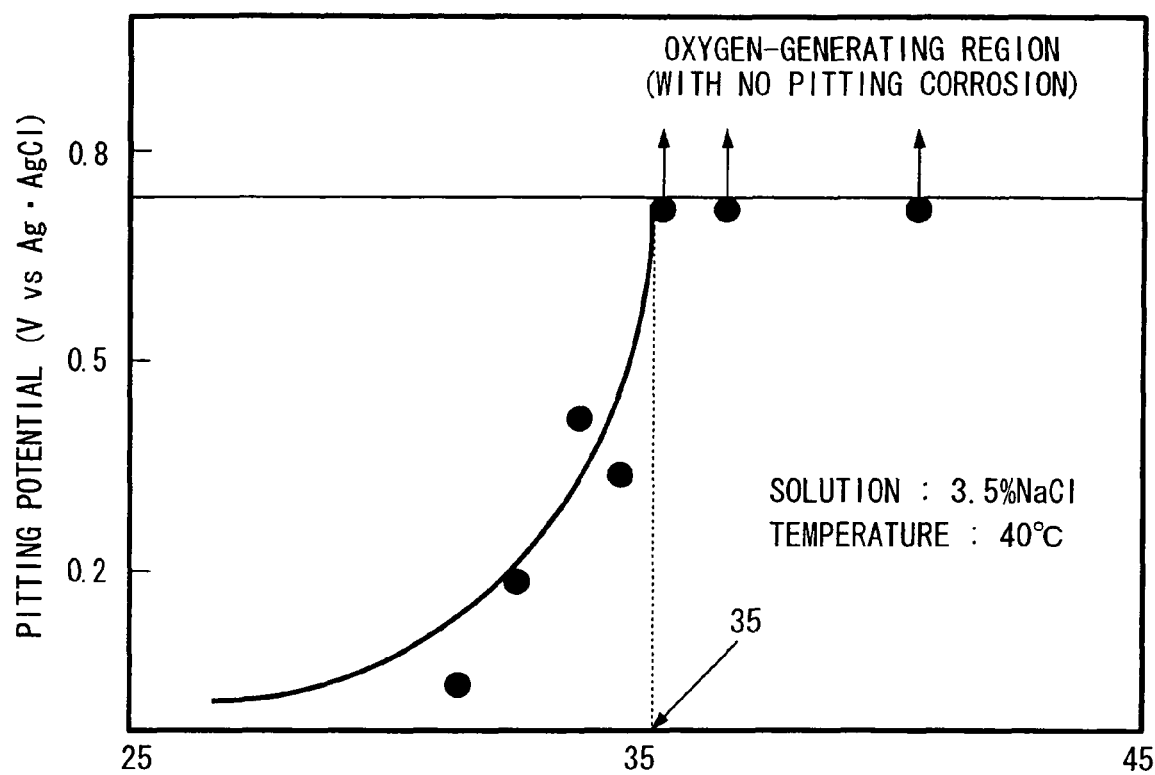
FIG. 5 is a diagram showing a relationship between a PI value (=Cr+3.3×Mo+10.4×N) of a weld metal and a pitting potential in a solution of 3.5% NaCl at 40° C. when N is more than 0.30 and equal to or less than 0.50%.
Figure 6:
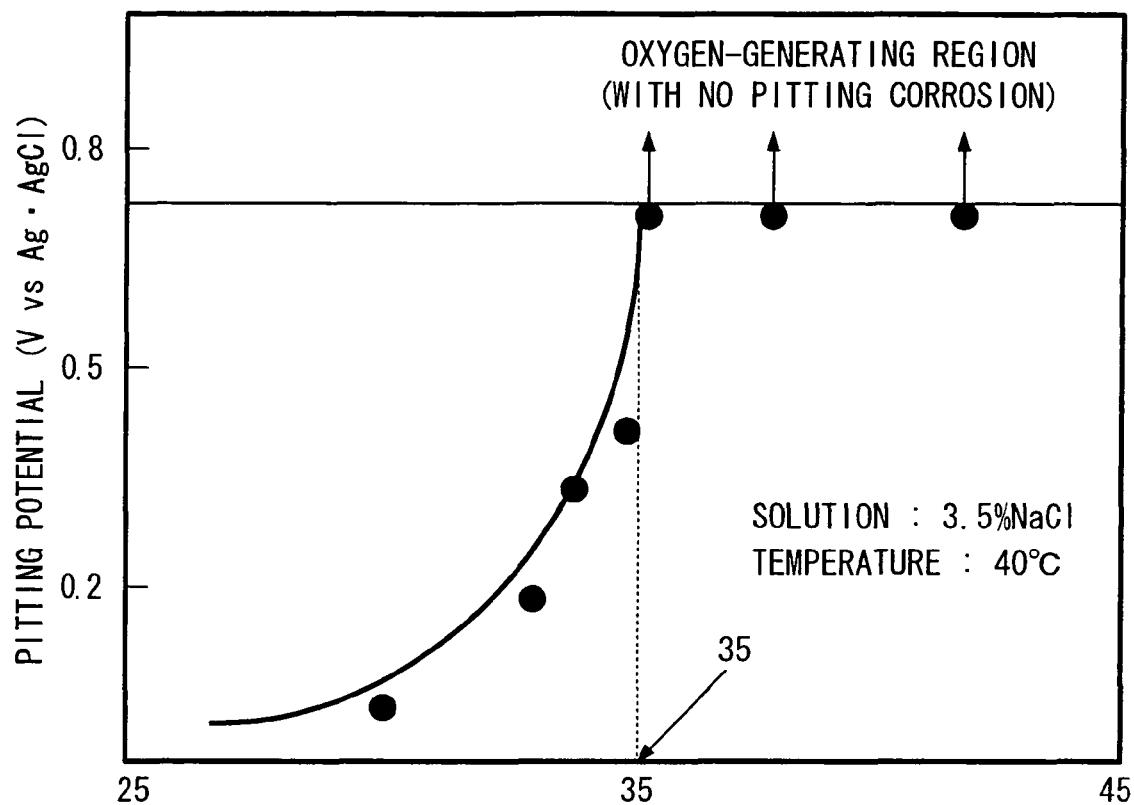
FIG. 6 is a diagram showing a relationship between a PI value (=Cr+3.3×Mo+16×N) of a weld metal and a pitting potential in a solution of 3.5% NaCl at 40° C. when N is equal to or less than 0.30%.

FIG. 5 and FIG. 6 show the relationship between the PI value of the welding wire and the pitting potential of the weld metal. As the pitting potential, a potential measured value at a current density of 100 mA/cm$^2$ when a pitting corrosion test is conducted in a 3.5% NaCl solution at 40° C. is shown.

$$\text{PI value} = \text{Cr} + 3.3 \times \text{Mo} + 10.4 \times \text{N} \tag{D}$$

Herein, the Cr, Mo, and N indicate contents (percent by mass) of the respective components in the welding wire. N is regulated to more than 0.30 through 0.50%.

$$\text{PI value} = \text{Cr} + 3.3 \times \text{Mo} + 16 \times \text{N} \tag{E}$$

Herein, the Cr, Mo, and N indicate contents (percent by mass) of the respective components in the welding wire. Further, N is regulated to 0.03 through 0.30%.

From FIG. 3, by setting the PI value defined by the equations (D) and (E) of the welding wire to 35 or more, the pitting potential becomes 0.73 V or more, and by this test pitting corrosion does not occur at all. Therefore, in the exemplary embodiment of the present invention, to sufficiently improve the pitting corrosion resistance of the weld metal in seawater environment, the component composition of the welding wire is regulated so that the PI value defined by the equations (D) and (E) satisfies 35 or more. The reason for the different coefficient in the case of an added amount of N exceeding 0.30 is the same as in the case of the Ni equivalent.

Next, the reason for limiting the component compositions of the austenitic stainless steel welding wire and austenitic stainless steel welding flux-cored wire in the exemplary embodiment of the present invention will be described below.

Symbol "%" shown below means "percent by mass" unless a special explanation is given for this.

The welding wire of the exemplary embodiment of the present invention means both a solid wire and a flux-cored wire. In the case of a flux-cored wire, the following components can be contained only in the outer coat or contained in both the outer coat and flux, and "%" in the outer coat or the outer coat and flux means percent by mass of component contents in the outer coat or both the outer coat and flux with respect to the total wire mass. The content Mw (percent by mass) of each component with respect to the total wire mass in the flux-cored wire is defined by the following equation (F).

$$Mw = (1-R) \times Mc + R \times Mf \tag{F}$$

Herein, Mc: content (percent by mass) of each component in the wire outer coat, Mf: content (percent by mass) of each component in the flux, and R: ratio (percent by mass) of flux with respect to the total wire mass.

C: C is harmful to corrosion resistance; however, a certain amount thereof should be contained in view of strength, so that 0.005% or more of C is added. If this content exceeds 0.05%, in a welding state or when reheating is applied, C combines with Cr and deposits Cr carbide, and significantly deteriorates the grain boundary corrosion resistance and pitting corrosion resistance and significantly lowers the toughness and ductility of the weld metal, so that this content was limited to 0.005 through 0.05%.

Si: Si is added as a deoxidizing element and an element that suppresses the surface tension of droplets, and if the content thereof is less than 0.1%, its effect is not sufficient, and on the other hand, if the content exceeds 1.0%, toughness significantly lowers according to lowering in ductility, and melting weld penetration when welding is also reduced and this poses a problem in practical welding. Therefore, the content was limited to 0.1 through 1.0%.

Mn: Mn is added as a deoxidizing element and an element that increases the solubility of N; however, if the content thereof is less than 1.0, the effect is not sufficient, and if over 3.5% is added, the ductility lowers, so that the content was limited to 1.0 through 3.5%.

Cr: Cr is a main element of an austenitic stainless steel to form a passivation film and contribute to improvement in corrosion resistance. In order to obtain excellent corrosion resistance in seawater environment, a Cr content of 25.0% or more is preferred. On the other hand, as the Cr content increases, the pitting corrosion resistance in seawater environment is further improved; however, brittle intermetallic compounds such as a sigma phase become easier to deposit, so that the toughness lowers. In addition, Cr is a ferrite-generating element; therefore, in order to realize solidification in a primary crystal austenite phase, Ni, Cu, and N should also be increased, and this lowers the wire productivity and increases the manufacturing cost, so that the upper limit of the Cr content was set to 28.0%.

Ni: Ni provides noticeable resistance against corrosion in a neutral chloride environment and strengthens a passivation film, so that the higher the Ni contents, the more effective it becomes for the corrosion resistance. In addition, Ni is an austenite generating element, and generates and stabilizes an austenite phase as a main element of an austenitic stainless steel. In the exemplary embodiment of the present invention, the component system should be set so as to solidify in a primary crystal austenite phase, so that in view of solidification morphology and phase balance when Cr as a ferrite-generating element is added at 25.0 through 28.0%, the Ni content was set to 16.0% through 23.9%. The reason for limiting the upper limit of the Ni content to 23.9% is that the Ni content increases the manufacturing cost although it does not cause lowering in wire productivity as in the case of Cr.

Mo: Mo is very effective element for stabilizing a passivation film and obtaining high corrosion resistance. In particular, improvement in pitting corrosion resistance in a chloride environment is apparent; however, if the content of this is less than 1.6%, this effect is insufficient. If the content exceeds 3.0%, intermetallic compounds such as a sigma phase are formed and toughness of the weld metal lowers, so that the content was limited to 1.6 through 3.0%.

Cu: Cu has a noticeable effect for improving the corrosion resistance, and in particular, it coexists with Ni and Mo and provides excellent corrosion resistance in a neutral acid environment, and this effect is apparent when the content is 0.1% or more; however, if over 0.5% is added, the effect is saturated and the toughness is lowered, so that the Cu content was set to 0.1 through 0.5%.

Al: Al is added as a deoxidizing element and an element for improving the droplet transfer phenomenon; however, if the content thereof is less than 0.001%, the effect is not sufficient, and on the other hand, excessive addition of Al reacts with N and generates AlN, and inhibits toughness. The degree depends on the N content as well, and if Al exceeds 0.02%, toughness lowering becomes remarkable, so that the Al content was limited to 0.001 through 0.02%.

N: N is a strong austenite generating element, and improves pitting corrosion resistance in a chloride environment. 0.03% or more of N improves pitting corrosion resistance and crevice corrosion resistance, and the higher the content, the greater the effect becomes. On the other hand, when the N content is set high, in order to set Cr equivalent/Ni equivalent to 0.85 or more, ferrite-generating elements such as Cr and Mo should be increased and this increases the manufacturing cost. Furthermore, when N exceeds 0.50%, blow holes more easily occur during welding. Therefore, the N content was limited to 0.03 through 0.50%.

O, P, and S are unavoidable components in the weld metal, and these are limited to small amounts for the following reasons:

O: O generates oxides and an excessive content thereof significantly lowers the toughness, so that the upper limit of the content was limited to 0.03%. In a flux-cored wire, various oxides are contained in the flux, and oxygen exists as compounds, and it is difficult to limit the amount of oxygen, so that the oxygen amount was limited only in a solid wire.

P: A high content of P lowers the high-temperature welding cracking resistance when solidifying and toughness, so that a low content is desirable, and an upper limit of the content was set to 0.03%.

S: A high content of S also lowers high-temperature cracking resistance, ductility, and corrosion resistance, so that a low content is desirable, and an upper limit of the content was set to 0.005%.

Basic components of the welding wire of the exemplary embodiment of the present invention are described above, and the following components can also be selectively added.

Ti: Ti combines with C and inhibits deposition of Cr carbide, and improves corrosion resistance of the weld metal. To obtain this effect, addition of 0.01% or more is effective; however, addition of more than 0.3% lowers ductility and toughness, so that when adding this, the content thereof was set to 0.01 through 0.3%.

Nb: Nb also combines with C and inhibits deposition of Cr carbide, and improves corrosion resistance of the weld metal. To obtain this effect, addition of 0.01% or more is effective; however, addition of more than 0.3% lowers ductility and toughness, so that when adding this, the content was set to 0.01 through 0.3%.

Ca: Ca is an element that improves hot workability, and improves the wire productivity. However, excessive addition thereof conversely lowers hot workability, so that when adding this, the content was set to 0.0005 through 0.0050%.

Mg: Mg is also an element that improves hot workability, and improves the wire productivity. However, excessive addition thereof conversely lowers hot workability, so that when adding this, the content was set to 0.0005 through 0.0050%.

In the exemplary embodiment of the present invention, as an austenitic stainless steel welding wire, a solid wire or flux-cored wire whose component contents are regulated as described above is used to weld austenitic stainless steel, whereby a weld metal having excellent low-temperature toughness and excellent corrosion resistance in seawater environment can be obtained.

The austenitic stainless steel welding wire of the exemplary embodiment of the present invention is used for TIG welding, MIG welding, plasma welding, laser welding, and submerge arc welding as welding methods, and can also be used as a core wire of a coated arc welding rod or an outer coat of a flux-cored wire. The welding wire is applied to manufacturing of welding structures, and can also be applied to repair welding or weld overlay of such structures.

In the exemplary embodiment of the present invention, an austenitic stainless steel base metal part of a weld joint is regulated so as to contain, in terms of percent by mass, C, 0.005 through 0.03%, Si: 0.1 through 1.5%, Mn: 0.1 through 3.0%, Ni: 15.0 through 21.0%, Cr: 22.0 through 28.0%, Mo: 1.5 through 3.5%, N, 0.15 through 0.35%, and Al: 0.005 through 0.1%, limit O to 0.007% or less, P to 0.05% or less, and 5 to 0.003% or less, further selectively contain one, two, or more of Cu: 0.1 through 2.0%, Ti: 0.003 through 0.03%, Nb: 0.02 through 0.20%, V: 0.05 through 0.5%, and W: 0.3 through 3.0%, where a PIW value defined by the following equation (G) is within a range between 35 and 40, and a δ cal value defined by the following equation (H) is within a range between −6 and +4, and a remainder made of iron and unavoidable impurities.

$$PIW\ value = Cr + 3.3(Mo + 0.5W) + 16N \tag{G}$$

$$\delta\ cal\ value = 2.9(Cr + 0.3Si + Mo + 0.5W) - 2.6(Ni + 0.3Mn + 0.25Cu + 32C + 20N) - 18 \tag{H}$$

Herein, the Cr, Mo, W, N, Si, Ni, Mn, Cu, and C described above indicate contents (percent by mass) of components in the steel material.

In the exemplary embodiment of the present invention, the austenitic stainless steel base metal of the weld joint sufficiently maintains corrosion resistance and low-temperature toughness, and to make a favorable hot workability when manufacturing such a steel material, upper limits and lower limits of the contents of the respective components are regulated for the following reasons.

Cr and Mo in the steel material are elements effective for corrosion resistance, and if the contents thereof fall below their lower limits, corrosion resistance becomes insufficient, and if the contents exceed their upper limits, toughness lowers due to deposition of intermetallic compounds, etc., so that the upper limits and lower limits of these component contents were regulated as described above.

Ni and N in the steel material are elements that stabilize the austenite phase and improve toughness and corrosion resistance thereof, and if their contents fall below their lower limits, the effect becomes insufficient, and excessive addition poses a problem in cost and manufacturing, so that the upper limits and lower limits of these contents were regulated as described above.

C in the steel material is contained to its lower limit or more in terms of securing strength; however, if a content exceeding its upper limit lowers corrosion resistance due to carbide generation, the upper limit and lower limit of this content were regulated as described above.

O, P, and S in the steel material are unavoidable impurities, and upper limits of their contents are limited as described above so as to inhibit lowering in toughness due to oxide generation from O and inhibit lowering in hot workability and toughness due to P and S.

Si, Mn, and Al in the steel material are added at their lower limits or more for deoxidization; however, they are regulated so as not to exceed their upper limits for securing toughness, and the upper and lower limits of the contents were regulated as described above.

One, two, or more of Cu, Ti, Nb, V, and W can be contained in the steel material.

Cu in the steel material is an element effective for corrosion resistance, and if its content falls below its lower limit, the effect becomes insufficient, and if the upper limit is exceeded, toughness lowers due to deposition of intermetallic compounds, etc., so that the upper and lower limits of these component contents were regulated as described above.

Ti, Nb, V, and W in the steel material are elements that inhibit generation of Cr carbide and improve corrosion resistance and toughness thereof by generating carbide and C, and if these contents fall below their lower limits, the effect stabilizing become insufficient, and excessive addition of these causes deposition of a large amount of carbide and lowers toughness, so that the upper and lower limits of these contents are regulated as described above.

The PIW value of the steel material is an index of corrosion resistance of austenitic stainless steel in a corrosive seawater environment, and in order to secure sufficient pitting corrosion resistance of the base metal of the weld joint in a corrosive seawater environment defined by the equation (G), the PIW value should be 35 or more. However, if Cr and Mo are added in large amounts to raise the PIW value, the steel material cost becomes very high, so that the upper limit of the PIW value was regulated to 40.

The δ cal value of the steel material is an index of a ferrite amount contained in the composition of an austenitic stainless steel, defined by the equation (H), and to secure hot workability, the ferrite amount should be regulated to a proper amount. If the δ cal value of the steel material exceeds +4, toughness lowers in the process of hot working. On the other hand, when the δ cal value of the steel material is smaller than −6, this means that the ferrite amount substantially becomes 0%, and this results in saturation of the effect for hot workability and addition of a large amount of expensive Ni, so that its lower limit was regulated to −6 in terms of cost.

The exemplary embodiment of the present invention regulates the base metal component composition of the weld joint as described above, and limits the component composition of the weld metal formed at the weld zone as follows.

First, a technical idea for improving low-temperature toughness and corrosion resistance in a seawater environment of a weld metal formed on a weld joint and a basic design of a weld metal component composition in the exemplary embodiment of the present invention will be described.

When weld metal is formed by welding austenitic stainless steel with a similar composition metal welding wire, the solidification morphology of the weld metal changes as described below due to the weld metal components, and this significantly influences the final weld metal composition at room temperature and low-temperature toughness of the weld metal.

Namely, the solidification morphology of the weld metal formed on the weld joint is classified into a solidification morphology in which a primary crystal solidified phase becomes an austenite phase or a ferrite phase and these phases independently complete solidification, and a solidification morphology in which solidification is completed in two phases of a ferrite phase+austenite phase.

Between these solidification morphologies, in the solidification morphology in which a primary crystal solidified phase of weld metal is a ferrite phase and solidification is completed in the single ferrite phase, after solidification, in the process of cooling the weld metal to room temperature, an austenite phase deposits in a needle shape; however, the ferrite phase in the weld metal at room temperature finally remains 20% or more in volume ratio, and as a result, the low-temperature toughness of the weld metal significantly lowers.

In the solidification morphology in which the primary crystal solidified phase of a weld metal is a ferrite phase, and due to subsequent deposition of an austenite phase, solidification is completed in two phases of the ferrite phase+the austenite phase, after solidification, in the process of cooling the weld metal to room temperature, the austenite phase grows into the ferrite phase as a dendrite core, whereby the ferrite amount in the weld metal at room temperature is finally reduced to approximately several through 20% in volume ratio. However, this ferrite phase in the weld metal links in a network form and remains, and when an impact load is applied, cracks propagate via the network-like ferrite phase, so that the low-temperature toughness of the weld metal lowers. In addition, in the weld metal at room temperature, in the ferrite phase diminishing like a network, Cr and Mo, etc., are thickened more than at the time of solidification, and brittle intermetallic compounds such as a sigma phase become easier to deposit, so that the toughness of the weld metal lowers.

On the other hand, in the solidification morphology in which the primary crystal solidified phase of a weld metal is an austenite phase, and due to subsequent deposition of a ferrite phase, solidification is completed in two phases of the austenite phase+the ferrite phase, after solidification, in the composition of the weld metal cooled to room temperature, the spherical ferrite phase disperses and remains between the austenite dendrites, and the ferrite amount is reduced to several percent or less, so that lowering in low-temperature toughness of the weld metal is less than in the above-described solidification morphology.

In the solidification morphology of a weld metal in which the primary crystal solidified phase of the weld metal is an austenite phase and solidification is completed in the single austenite phase, the low-temperature toughness of the weld metal is favorable; however, there is a tendency that high-temperature solidification cracks of the weld metal more easily occur when welding.

Based on the above-mentioned finding, the technical idea of the exemplary embodiment of the present invention is, by optimizing the element composition of the welding metal, with suppressing the occurrence of the solidification cracks, achieving the solidification morphology in which the primary crystal solidified phase of a weld metal formed by welding is an austenite phase to decrease a ferrite phase in the welding metal harmful to low-temperature toughness.

The component system of a weld metal for realizing such a technical idea and improving the low-temperature toughness of the weld metal could be regulated by using the following indexes of the Cr equivalent and Ni equivalent.

FIG. 2 shows the relationship between the Cr equivalent and Ni equivalent of a weld metal and solidification morphology of the weld metal.

FIG. 4 shows the relationship between a solidification crack length in a varestraint test and the Cr equivalent/Ni equivalent.

Herein, the Cr equivalent and Ni equivalent of the weld metal are defined by the following equations (I) and (J). The Cr equivalent is an index indicating the degree of contribution of the weld metal components to the formation of a ferrite phase, and the Ni equivalent is an index indicating the degree of contribution of the weld metal components to the formation of an austenite phase.

$$\text{Cr equivalent} = Cr + Mo + 1.5 \times Si \tag{I}$$

$$\text{Ni equivalent} = Ni + 0.5 \times Mn + 30 \times C + 30 \times N \tag{J}$$

Herein, the Cr, Mo, Si, Ni, Mn, C, and N indicate contents (percent by mass) of the respective components in the weld metal.

From FIG. 2, it is confirmed that when the Cr equivalent/Ni equivalent of the weld metal is 1.0 or more and 1.2 or less, the solidification morphology is altered so that the primary crystal solidified phase of the weld metal becomes an austenite phase, due to subsequent deposition of a ferrite phase, solidification is completed in two phases of the ferrite phase+the austenite phase, and at room temperature the ferrite amount harmful to low-temperature toughness in the weld metal is reduced, and the low-temperature toughness can be improved (shown by the black circles • in FIG. 2).

On the other hand, when the Cr equivalent/Ni equivalent of the weld metal exceeds 1.2, the primary crystal solidified phase of the weld metal becomes a ferrite phase, and then, even if the solidification is completed in the single ferrite phase, or even if the solidification is completed in two phases of the ferrite phase+an austenite phase due to deposition of the austenite phase, the weld metal at room temperature contains a large amount of the ferrite phase harmful to low-temperature toughness, so that the desired improvement in low-temperature toughness cannot be realized (shown by white circles ○ in FIG. 2).

When the Cr equivalent/Ni equivalent becomes less than 1.0, the primary crystal solidified phase of the weld metal becomes an austenite phase, and thereafter, solidification is completed in the single austenite phase. In this solidification morphology of the weld metal, it is known that solidification cracks tend to easily occur in the weld metal during welding (shown by white squares □ in FIG. 2) although the ferrite amount at room temperature harmful to low-temperature toughness in the weld metal is reduced and the low-temperature toughness of the weld metal becomes favorable.

However, a Cr equivalent/Ni equivalent of less than 1.0 only regulates the component system just by the difference in the solidification morphology that brings about austenite single phase solidification, and is not related to actual solidification cracks. Therefore, components that do not cause solidification cracks while reducing the ferrite phase harmful to low-temperature toughness to its lower limit were earnestly considered. The result of this investigation is shown in FIG. 4. Even in the case of a Cr equivalent/Ni equivalent of less than 1.0 of the weld metal and austenite single phase solidification, solidification cracks do not occur when the Cr equivalent/Ni equivalent is 0.85 or more. On the other hand, when the Cr equivalent/Ni equivalent becomes less than 0.85, solidification cracks occur, and further, the solidification crack length becomes longer as Cr equivalent/Ni equivalent becomes smaller. Namely, in terms of solidification cracking sensitivity of the weld metal, it was found that, even with the component system that brought about an austenite single phase solidification, solidification cracks do not occur if the Cr equivalent/Ni equivalent is 0.85 or more.

Therefore, in the exemplary embodiment of the present invention, to sufficiently improve the low-temperature toughness of the weld metal by inhibiting solidification cracks of the weld metal by reducing the ferrite phase harmful to low-temperature toughness in the weld metal to a degree that does not cause solidification cracks while maintaining excellent weldability, the component composition of the weld metal is regulated so that the ratio of the Cr equivalent and Ni equivalent (Cr equivalent/Ni equivalent) of the weld metal defined by the equations (I) and (J), respectively, satisfies the range between 0.85 and 1.2.

In addition, when welding austenitic stainless steel with a similar composition metal welding wire, for pitting corrosion resistance of the weld metal in a seawater corrosive environment, metal components were regulated by a PI value defined by the following equation (K).

FIG. 6 shows the relationship between the PI value of the weld metal and pitting potential of the weld metal. As the pitting potential, a potential measured value at a current density of 100 mA/cm² in a pitting corrosion test in a 3.5% NaCl solution at 40° C. is shown.

$$\text{PI value} = Cr + 3.3 \times Mo + 16 \times N \tag{K}$$

Herein, the Cr, Mo, and N indicate contents (percent by mass) of the respective components in the weld metal.

From FIG. 6, by setting the PI value defined by the equation (K) of the weld metal to 35 or more, the pitting potential becomes 0.73 V or more, and by this test, the pitting corrosion does not occur at all.

Therefore, in the exemplary embodiment of the present invention, to sufficiently improve the corrosion resistance of the weld metal in a seawater environment, the component composition of the weld metal is regulated so that the PI value defined by the equation (K) satisfies 35 or more.

Next, the reason for limiting the component compositions of the weld metal formed on a weld joint in the exemplary embodiment of the present invention will be described below.

Symbol "%" shown below means "percent by mass" unless a special explanation is given.

The contents of the respective components of the weld metal described below can be adjusted to predetermined ranges by using either a solid wire or a flux-cored wire, considering the dilution of the steel material components in the weld metal, and adjusting the components in the wire.

C: C is harmful to corrosion resistance; however, a certain amount of this should be contained in view of strength, so that 0.005% or more of C is added. If this content exceeds 0.05%, in a welding state or when reheating is applied, C combines with Cr and deposits Cr carbide, and significantly deteriorates the grain boundary corrosion resistance and pitting corrosion resistance and significantly lowers the toughness and ductility of the weld metal, so that this content was limited to 0.005 through 0.05%.

Si: Si is added as a deoxidizing element and an element that reduces surface tension of droplets; however, if the content thereof is less than 0.1%, its effect is not sufficient, and on the other hand, if the content exceeds 1.0%, toughness significantly lowers according to lowering in ductility, and melting weld penetration when welding is also reduced and this poses a problem in practical welding. Therefore, the content was limited to 0.1 through 1.0%.

Mn: Mn is added as a deoxidizing element and an element that increases the solubility of N; however, if the content thereof is less than 1.0, the effect is not sufficient, and if over 3.5% is added, the ductility lowers, so that the content was limited to 0.1 through 3.5%.

Cr: Cr is a main element of austenitic stainless steel to form a passivation film and contribute to improvement in corrosion resistance. In order to obtain excellent corrosion resistance in a seawater environment, a Cr content of 25.0% or more is preferred. As the Cr content increases, the pitting corrosion resistance in a seawater environment is further improved;

however, brittle intermetallic compounds such as a sigma phase become easier to deposit, so that the toughness lowers. In addition, Cr is a ferrite-generating element, so that to realize solidification in a primary crystal austenite phase, Ni, Cu, and N should also be increased, and this lowers productivity of the wire used for welding and increases the manufacturing cost, so that the upper limit of the Cr content was set to 28.0%.

Ni: Ni provides noticeable resistance against corrosion in a neutral chloride environment and strengthens a passivation film, so that the higher the Ni content, the more effective it becomes for the corrosion resistance. In addition, Ni is an austenite generating element, and generates and stabilizes the austenite phase as a main element of an austenitic stainless steel. In the exemplary embodiment of the present invention, the component system should be set so as to solidify in a primary crystal austenite phase, so that in view of solidification morphology and phase balance when Cr as a ferrite-generating element is added at 25.0 through 28.0%, the Ni content was set to 16.0% through 23.9%. The reason for limiting the upper limit of the Ni content to 23.9% is that the Ni content increases the manufacturing cost of a wire to be used for welding.

Mo: Mo is a very effective element for stabilizing a passivation film and obtaining high corrosion resistance. In particular, improvement in pitting corrosion resistance in a chloride environment is noticeable; however, if the content thereof is less than 1.6%, this effect is insufficient. If the content exceeds 3.0%, brittle intermetallic compounds such as a sigma phase are formed and toughness of the weld metal lowers, so that the content has limited to 1.6 through 3.0%.

Cu: Cu has a noticeable effect for improving the corrosion resistance, and in particular, it coexists with Ni and Mo and provides excellent corrosion resistance in a neutral acid environment, and this effect is apparent when the content is 0.1% or more; however, if over 0.5% is added, the effect is saturated and the toughness is lowered, so that the Cu content was set to 0.1 through 0.5%.

Al: Al is added as a deoxidizing element and an element for improving the droplet transfer phenomenon; however, if the content of this is less than 0.001%, the effect thereof is not sufficient, and on the other hand, excessive addition of Al reacts with N and generates AlN, and inhibits toughness. The degree thereof depends on the N content as well, and if Al exceeds 0.02%, toughness lowering becomes remarkable, so that the Al content was limited to 0.001 through 0.02%.

N: N is a strong austenite generating element, and improves pitting corrosion resistance in a chloride environment. 0.03% or more of N improves pitting corrosion resistance and crevice corrosion resistance, and the higher the content, the greater the effect becomes. On the other hand, when the N content is set high, to set Cr equivalent/Ni equivalent to 0.85 or more, ferrite-generating elements such as Cr and Mo should be increased and this increases the manufacturing cost. Furthermore, when N exceeds 0.35%, blow holes more easily occur during welding. Therefore, the N content was limited to 0.03 through 0.35%.

O, P, and S are unavoidable components in the weld metal, and these are limited to small amounts for the following reasons:

O: O generates oxides and an excessive content thereof significantly lowers the toughness, so that the upper limit of the content was set to 0.10%.

P: A high content of P lowers the high-temperature welding cracking resistance when solidifying and toughness, so that a low content is desirable, and an upper limit of the content was set to 0.03%.

S: A high content of S also lowers high-temperature cracking resistance, ductility, and corrosion resistance, so that a low content is desirable, and an upper limit of the content was set to 0.05%.

Basic components of the welding wire of the exemplary embodiment of the present invention are described above, and the following components can also be selectively added.

Ti: Ti combines with C and inhibits deposition of Cr carbide, and improves corrosion resistance of the weld metal. To obtain this effect, addition of 0.01% or more is effective; however, addition of more than 0.3% lowers ductility and toughness, so that when adding this, the content of this was set to 0.01 through 0.3%.

Nb: Nb also combines with C and inhibits deposition of Cr carbide, and improves corrosion resistance of the weld metal. To obtain this effect, addition of 0.01% or more is effective; however, addition of more than 0.3% lowers ductility and toughness, so that when adding this, the content was set to 0.01 through 0.3%.

Ca: Ca is an element that improves hot workability, and improves the productivity of a wire to be used for welding. However, excessive addition thereof conversely lowers hot workability so that when adding this, the content was set to 0.0005 through 0.0050%.

Mg: Mg is also an element that improves hot workability, and improves the productivity of a wire to be used for welding. However, excessive addition thereof conversely lowers hot workability so that when adding this, the content was set to 0.0005 through 0.0050%.

In the exemplary embodiments of the present invention, by regulating the component contents of the weld metal formed on the weld joint using austenitic stainless steel as a base metal as described above, a weld metal having excellent low-temperature toughness and corrosion resistance in a seawater environment can be obtained.

In the exemplary embodiment of the present invention, to make this effect more stable and effective, the welding conditions when forming weld metal on the weld joint are preferably limited as follows.

The weld metal of the exemplary embodiment of the present invention can be formed by either a gas shield arc welding or tungsten arc welding method, and the welding heat input Q and the base metal dilution ratio D are preferably limited for the following reasons.

$$Q = \text{welding current} \times \text{welding voltage} \times \text{welding time} / \text{welding length} \quad (L)$$

$$D = \text{melt volume of base metal} / \text{total weld metal volume} \quad (M)$$

Welding heat input Q: When an austenitic stainless steel containing Cr and Mo is kept in a temperature range between 700° C. and 900° C., brittle intermetallic compounds such as a sigma phase harmful to toughness deposit and significantly lower the toughness. In the cooling process after solidification, if the period of time in which the weld metal to be formed on the weld joint passes 900° C. through 700° C. becomes long, a sigma phase, etc., harmful to toughness deposits. In addition, in a weld metal formed by multilayer pass welding, when the previous layer pass receives a heat cycle due to the subsequent pass and the period of time at 700° C. through 900° C. is lengthened, a sigma phase harmful to toughness deposits as well.

In the exemplary embodiment of the present invention, by regulating the component compositions of an austenitic stainless steel base metal and an austenitic stainless steel weld metal as described above, deposition of intermetallic compounds such as a sigma phase harmful to toughness is inhibited, whereby a weld joint made of an austenitic stainless steel base metal and a weld metal excellent in toughness can be obtained. However, in gas shield arc welding or tungsten arc welding, if the weld heat input exceeds more than 20,000 J/cm, the cooling rate becomes low and the cooling period from 900° C. to 700° C. is lengthened, intermetallic compounds such as a sigma phase deposit, and the toughness may lower. In the case of an excessive heat input of more than 20,000 J/cm, the weld bead shape becomes convex, and high-temperature cracks occur at the bead center. Therefore, in order to stably provide toughness of the weld joint, it is preferable that the manufacturing condition of the weld structure, that is, the weld heat input when welding is limited to 20,000 J/cm or less.

Base metal dilution ratio D: In the exemplary embodiment of the present invention, in terms of providing low-temperature toughness of the weld metal, in order to limit the primary crystal solidified phase of the weld metal to an austenite phase and inhibit deposition of intermetallic compounds such as a sigma phase harmful to toughness, the component composition of the weld metal at the weld joint is regulated so that the Ni content is higher and the Mo content is lower than in the austenitic stainless steel base metal. However, if the base metal dilution ratio becomes more than 30% due to melting of the base metal components in the weld metal components when welding, the components of the weld metal pass into the base metal components side with a low Ni content and a high Mo content, so that the ratio of the Cr equivalent/Ni equivalent of the weld metal becomes more than 1.2, and the primary crystal solidified phase becomes a ferrite phase and lowers the low-temperature toughness of the weld metal. In addition, the Mo content in the weld metal also increases, so that the intermetallic compounds such as the sigma phase harmful to the toughness becomes easier to deposit and lowers the toughness of the weld metal. Therefore, as a manufacturing condition of the weld structure, that is, a welding condition, the base metal dilution ratio in the case of gas shield arc welding or tungsten arc welding is preferably limited to 30% or less.

Pulsed arc welding: If a weld metal is formed by gas shield arc welding or tungsten arc welding by using a welding wire containing N, blow holes easily occur in the weld metal due to $N_2$ gas, and this lowers toughness of the weld metal. To the austenitic stainless weld metal of the exemplary embodiment of the present invention, for improvement in a corrosion resistance, 0.03 or more of N is added, and in order to inhibit the occurrence of blow holes, the upper limit of the content thereof is set to 0.35%, and further, as a welding method that inhibits the occurrence of blow holes, pulsed arc welding is preferably used.

Pulsed arc welding is a welding method in which a high current and a low current are alternately supplied and deep melting is obtained while lowering the total heat input, and the melt metal vibrates due to the current change, so that $N_2$ gas generated in the melt metal easily rises to the surface of the melt metal, and this method also has an effect to inhibit the occurrence of blow holes. In this case, if a difference between a peak current and a base current becomes smaller than 20 A, when the duty ratio R (=peak current period/(peak current period+base current period)) as a ratio of the peak current period is less than 0.2 and more than 0.6 and the frequency is less than 10 Hz, the vibration of the melt metal is less and the rise of the $N_2$ gas is not sufficient, so that the blow hole-inhibiting effect cannot be effectively utilized. From this fact, it is preferable that, as a manufacturing condition of a weld structure, that is, as a welding condition, pulsed arc be used, the difference between the peak current and the base current be set to 20 A or more, the duty ratio R be set to 0.2 through 0.6, and the frequency be set to 10 Hz or more in gas shield arc welding or tungsten arc welding.

In the exemplary embodiments of the present invention, when manufacturing a weld structure made of an austenitic stainless steel base metal and an austenitic stainless steel weld metal whose component compositions are regulated as described above, by performing the gas shield arc welding or tungsten arc welding of the above-described welding method, a weld structure having a weld metal that has excellent low-temperature toughness and corrosion resistance in a seawater environment can be stably obtained.

The austenitic stainless steel weld structure of the exemplary embodiment of the present invention can also be manufactured by plasma welding or laser welding. Furthermore, this manufacturing method is applicable not only to manufacturing of weld structures but also to repair welding or weld overlay of such structures.

Hereinafter, the exemplary embodiments of the present invention will be described.

Table 1 shows compositions of manufactured welding solid wires. The wire diameter is 1.2 mm. The remainder of the compositions shown in Table 1 are iron and unavoidable impurities, and solidification modes are expressed so that a solidification mode in which solidification is completed in an austenite single phase is indicated by A, a mode in which solidification is completed in two phases of a primary crystal austenite+ferrite is indicated by AF, and a solidification mode in which solidification is completed in two phases of primary crystal ferrite+austenite is indicated by FA. Next, a groove with a groove angle of 60° and a root face of 1 mm is formed in the austenitic stainless steel (plate thickness: 12 mm) whose components are shown in Table 2, and by using welding solid wires shown in FIG. 1, weld joints were prepared by tungsten arc welding (TIG welding) at a welding current: 200 A, an arc voltage: 12 V, and a welding rate: 10 cm/min. The shield gas was 100% Ar gas, and the gas flow rate was set to 15 liters/min.

From the respective weld joints, V-notched test pieces regulated in JIS Z 2202 were sampled, and a Charpy impact test was conducted at a test temperature of −40° C. In addition, pitting corrosion test pieces were sampled from the surface layers of the weld metals, and pitting potentials were measured in a 3.5% NaCl solution at 40° C. according to the method regulated in JIS G 0577.

Table 3 shows the results of the Charpy impact test and the results of the pitting potential. The pitting potentials in Table 3 are potentials when the current density is 100 mA/cm$^2$, and the white circles 0 of the pitting potentials mean that no pitting corrosion occurred and oxygen was generated due to electrolysis of water.

In Table 3, in the comparative example of symbol H, Cr is out of the range and the PI value is low, so that pitting corrosion occurs. In the example of symbol J, Ni content is low, and in the example of symbol K, Cr and Mo above the regulated range are contained, so that the ratio of the Cr equivalent/Ni equivalent exceeds 1.2, and this brings about primary crystal ferrite phase solidification, and significantly lowers the Charpy impact value. In the example of symbol L, the elements are within their ranges; however, due to the low PI value, pitting corrosion occurs. In the example of symbol M, the respective elements are all within the ranges; however, the ratio of the Cr equivalent/Ni equivalent exceeds 1.2 and brings about primary crystal ferrite phase solidification, so that the Charpy impact value is low. In the example of symbol N, the Charpy impact value and the corrosion resistance are both favorable; however, the ratio of the Cr equivalent/Ni equivalent is less than 0.85, so that solidification cracks occur when welding.

On the other hand, in the examples of the exemplary embodiments of the present invention shown by symbols A through G, the component contents and the relationship among the components are within the ranges of the exemplary embodiments of the present invention, so that the Charpy impact value becomes higher in comparison with the comparative example and pitting corrosion does not occur.

TABLE 1

Chemical Composition of Sample Wire (Percent by Mass)

| Symbol | | C | Si | Mn | P | S | Cr | Ni | Mo | Cu | Al | N | O | Ti | Nb | Ca | Mg | PI | Creq/Nieq | Solidification Mode |
|---|---|---|---|---|---|---|---|---|---|---|---|---|---|---|---|---|---|---|---|---|
| Present Invention | A | 0.015 | 0.43 | 2.98 | 0.016 | 0.001 | 25.3 | 22.2 | 2.6 | 0.24 | 0.012 | 0.394 | 0.005 | | | | | 38.0 | 0.90 | A |
| | B | 0.021 | 0.43 | 3.02 | 0.018 | 0.001 | 26.2 | 17.2 | 2.1 | 0.19 | 0.015 | 0.423 | 0.009 | | | | | 37.5 | 1.05 | AF |
| | C | 0.025 | 0.59 | 1.87 | 0.012 | 0.003 | 27.8 | 23.5 | 2.0 | 0.31 | 0.014 | 0.417 | 0.003 | 0.22 | | | | 38.7 | 0.92 | A |
| | D | 0.011 | 0.71 | 2.47 | 0.021 | 0.002 | 27.4 | 18.7 | 2.4 | 0.27 | 0.013 | 0.424 | 0.006 | | 0.24 | | | 39.7 | 1.08 | AF |
| | E | 0.023 | 0.37 | 1.98 | 0.015 | 0.001 | 26.8 | 20.4 | 1.7 | 0.17 | 0.008 | 0.379 | 0.010 | 0.17 | 0.15 | | | 36.4 | 0.99 | A |
| | F | 0.031 | 0.54 | 2.84 | 0.023 | 0.003 | 25.9 | 21.6 | 1.9 | 0.24 | 0.015 | 0.461 | 0.008 | | | 0.002 | | 36.9 | 0.87 | A |
| | G | 0.018 | 0.62 | 3.12 | 0.021 | 0.001 | 27.1 | 18.0 | 2.2 | 0.26 | 0.011 | 0.415 | 0.009 | | | 0.001 | 0.001 | 38.7 | 1.07 | AF |
| Comparative Example | H | 0.023 | 0.42 | 1.87 | 0.017 | 0.002 | *24.1* | 19.6 | 2.1 | 0.13 | 0.013 | 0.310 | 0.004 | | | | | *34.3* | 0.98 | A |
| | J | 0.020 | 0.55 | 2.67 | 0.023 | 0.002 | 27.1 | *15.3* | 1.9 | 0.27 | 0.018 | 0.312 | 0.003 | | | | | 36.6 | *1.28* | FA |
| | K | 0.017 | 0.57 | 2.14 | 0.024 | 0.003 | *28.4* | 17.8 | 2.9 | 0.21 | 0.014 | 0.307 | 0.007 | | | | | 41.2 | *1.27* | FA |
| | L | 0.019 | 0.49 | 1.62 | 0.019 | 0.001 | 25.6 | 20.4 | 1.7 | 0.25 | 0.011 | 0.319 | 0.003 | | | | | *34.5* | 1.00 | AF |
| | M | 0.018 | 0.42 | 1.48 | 0.018 | 0.002 | 27.7 | 16.5 | 2.3 | 0.22 | 0.015 | 0.315 | 0.008 | | | | | 38.6 | *1.28* | FA |
| | N | 0.021 | 0.51 | 3.15 | 0.022 | 0.002 | 25.1 | 22.4 | 1.8 | 0.26 | 0.015 | 0.431 | 0.005 | | | | | 35.5 | *0.83* | A |

PI = Cr + 3.3 × Mo + 10.4 × N
Cr eq = Cr + Mo + 1.5 × Si
Ni eq = Ni + 0.5 × Mn + 30 × C + 19.5 × N
A: Solidification in austenite single phase,
AF: solidification in two phases of primary austenite + ferrite,
FA: solidification in two phases of primary crystal ferrite + austenite
Italic type: out of range of the exemplary embodiment of the present invention

TABLE 2

Chemical Composition of Sample Base Metal (Percent by Mass)

| C | Si | Mn | P | S | Cr | Ni | Mo | Cu | Al | N | O |
|---|---|---|---|---|---|---|---|---|---|---|---|
| 0.020 | 0.37 | 0.45 | 0.020 | 0.0004 | 25.2 | 17.7 | 2.4 | 0.14 | 0.020 | 0.280 | 0.0052 |

TABLE 3

| Symbol | | Charpy absorption energy (J) (−40° C.) | Pitting potential (V vs Ag—AgCl) |
|---|---|---|---|
| Present Invention | A | 125 | ∘ |
| | B | 112 | ∘ |
| | C | 96 | ∘ |
| | D | 103 | ∘ |
| | E | 109 | ∘ |
| | F | 98 | ∘ |
| | G | 107 | ∘ |
| Comparative Example | H | 104 | 0.467 |
| | J | 34 | ∘ |
| | K | 41 | ∘ |
| | L | 110 | 0.489 |
| | M | 37 | ∘ |
| | N | 106 | ∘ |

In the example of symbol N, solidification cracks occurred.

Further exemplary embodiments of the present invention will be further described.

Table 4 shows the compositions of the manufactured welding solid wires. The wire diameter is 1.2 mm. The remainder of the compositions shown in Table 1 are iron and unavoidable impurities, and a solidification mode in which solidification is completed in an austenite single phase is indicated as A, a solidification mode in which solidification is completed in two phases of primary crystal austenite+ferrite is indicated as AF, and a solidification mode in which solidification is completed in two phases of primary crystal ferrite+austenite is indicated as FA. Next, on a stainless steel plate of SUS304 with a thickness of 10 mm, deposit welding of ten layers was performed according to a gas shield welding method at a welding current: 150 through 200 A, an arc voltage: 23 through 31V, a welding rate: 30 through 40 cm/min, and a 98%Ar+2%$O_2$ shield gas flow rate: 20 liters/min by using the welding solid wires.

Furthermore, flux-cored wires with a wire diameter of 1.2 mm containing the compositions shown in Table 5 in percent by mass with respect to the total wire mass were manufactured. The remainder of the compositions shown in Table 5 are also iron and unavoidable impurities, and a solidification mode in which solidification is completed in a single austenite phase is indicated as A, a solidification mode in which solidification is completed in two phases of primary crystal austenite+ferrite is indicated as AF, and a solidification mode in which solidification is completed in two phases of primary crystal ferrite+austenite is indicated as FA. Next, on a stainless steel plate of SUS304 with a plate thickness of 10 mm, deposit welding of ten layers was performed at a welding current: 150 through 200 A, an arc voltage: 23 through 31V, a welding rate: 30 through 40 cm/min, and a 100% $CO_2$ shield gas flow rate: 20 liters/min by using the flux-cored wires.

TABLE 4

Chemical Composition of Sample Wire (Percent by Mass)

| Symbol | | C | Si | Mn | P | S | Cr | Ni | Mo | Cu | Al | N | O | Ti | Nb | Ca | Mg | PI | Creq/Nieq | Solidification Mode |
|---|---|---|---|---|---|---|---|---|---|---|---|---|---|---|---|---|---|---|---|---|
| Present Invention | a | 0.022 | 0.72 | 1.76 | 0.016 | 0.002 | 25.3 | 22.1 | 2.6 | 0.25 | 0.015 | 0.127 | 0.001 | | | | | 35.9 | 1.06 | AF |
| | b | 0.016 | 0.41 | 1.81 | 0.015 | 0.001 | 26.3 | 16.1 | 1.7 | 0.24 | 0.016 | 0.282 | 0.005 | | | | | 36.4 | 1.10 | AF |
| | c | 0.021 | 0.36 | 2.01 | 0.021 | 0.002 | 25.5 | 17.1 | 2.1 | 0.26 | 0.015 | 0.251 | 0.002 | | | | | 36.4 | 1.07 | AF |

TABLE 4-continued

Chemical Composition of Sample Wire (Percent by Mass)

| | Symbol | C | Si | Mn | P | S | Cr | Ni | Mo | Cu | Al | N | O | Ti | Nb | Ca | Mg | PI | Creq/Ni eq | Solidification Mode |
|---|---|---|---|---|---|---|---|---|---|---|---|---|---|---|---|---|---|---|---|---|
| | d | 0.018 | 0.82 | 0.96 | 0.019 | 0.002 | 27.1 | 20.5 | 2.3 | 0.34 | 0.009 | 0.167 | 0.003 | | | | | 37.4 | 1.15 | AF |
| | e | 0.025 | 0.59 | 1.34 | 0.012 | 0.003 | 27.2 | 23.3 | 2.7 | 0.18 | 0.013 | 0.052 | 0.002 | | | | | 36.9 | 1.17 | AF |
| | f | 0.018 | 0.78 | 1.21 | 0.021 | 0.003 | 26.7 | 22.5 | 1.9 | 0.35 | 0.016 | 0.189 | 0.001 | 0.21 | | | | 36.0 | 1.02 | AF |
| | g | 0.025 | 0.21 | 1.32 | 0.018 | 0.002 | 26.1 | 21.8 | 2.2 | 0.27 | 0.012 | 0.124 | 0.002 | | 0.26 | | | 35.3 | 1.06 | AF |
| | h | 0.021 | 0.74 | 0.93 | 0.019 | 0.001 | 25.2 | 18.3 | 2.5 | 0.19 | 0.008 | 0.172 | 0.004 | 0.18 | 0.19 | | | 36.2 | 1.17 | AF |
| | i | 0.031 | 0.88 | 2.27 | 0.017 | 0.002 | 25.9 | 16.7 | 2.7 | 0.41 | 0.015 | 0.241 | 0.002 | | | 0.002 | | 38.7 | 1.15 | AF |
| | j | 0.023 | 0.71 | 0.86 | 0.022 | 0.003 | 27.6 | 23.5 | 1.8 | 0.21 | 0.011 | 0.098 | 0.005 | | | 0.001 | 0.001 | 35.1 | 1.11 | AF |
| Comparative Example | k | *0.089* | 0.68 | 1.05 | 0.019 | 0.002 | *24.2* | 16.2 | 1.8 | 0.24 | 0.013 | 0.138 | 0.004 | | | | | *32.3* | 1.15 | AF |
| | l | 0.024 | 0.54 | 1.44 | 0.022 | 0.002 | 27.8 | *15.3* | 2.8 | 0.31 | 0.015 | 0.162 | 0.002 | | | | | 39.6 | *1.45* | FA |
| | m | 0.017 | 0.73 | 0.95 | 0.023 | 0.002 | *28.4* | 21.4 | *3.2* | 0.27 | 0.018 | 0.102 | 0.002 | | | | | 40.6 | *1.28* | FA |
| | n | 0.018 | 0.85 | 0.88 | 0.022 | 0.003 | 26.4 | 23.4 | 2.1 | 0.21 | 0.014 | *0.020* | 0.003 | | | | | *33.7* | 1.19 | AF |
| | o | 0.026 | 0.69 | 1.15 | 0.019 | 0.001 | 25.1 | 21.7 | 2.2 | 0.25 | 0.011 | 0.106 | 0.001 | | | | | *34.1* | 1.08 | AF |
| | p | 0.021 | 0.51 | 1.19 | 0.018 | 0.002 | 27.1 | 17.2 | 2.5 | 0.22 | 0.015 | 0.114 | 0.002 | | | | | 37.2 | *1.39* | FA |
| | q | 0.031 | 0.78 | 0.96 | 0.022 | 0.002 | 25.7 | 22.9 | 1.9 | 0.26 | 0.015 | 0.215 | 0.002 | | | | | 35.4 | *0.94* | A |

PI = Cr + 3.3 × Mo + 16 × N
Cr eq = Cr + Mo + 1.5 × Si
Ni eq = Ni + 0.5 × Mn + 30 × C + 30 × N
A: Solidification in austenite single phase,
AF: solidification in two phases of primary crystal austenite + ferrite,
FA: solidification in two phases of primary crystal ferrite + austenite

TABLE 5

Chemical Composition of Sample Flux-Cored Wire (Total of Outer Coat and Flux) (Percent by Mass)

| | Symbol | C | Si | Mn | P | S | Cr | Ni | Mo | Cu | Al | N | Ti | Nb | PI | Creq/Ni eq | Solidification Mode |
|---|---|---|---|---|---|---|---|---|---|---|---|---|---|---|---|---|---|
| Present Invention | A | 0.021 | 0.69 | 1.84 | 0.015 | 0.001 | 25.1 | 22.4 | 2.5 | 0.24 | 0.017 | 0.124 | | | 35.3 | 1.03 | AF |
| | B | 0.022 | 0.42 | 1.78 | 0.015 | 0.001 | 26.5 | 16.2 | 1.8 | 0.25 | 0.016 | 0.264 | | | 36.7 | 1.13 | AF |
| | C | 0.016 | 0.41 | 2.14 | 0.014 | 0.002 | 25.4 | 17.2 | 2.2 | 0.26 | 0.014 | 0.243 | | | 36.5 | 1.08 | AF |
| | D | 0.024 | 0.95 | 0.95 | 0.021 | 0.002 | 27.1 | 20.9 | 2.4 | 0.19 | 0.013 | 0.153 | | | 37.5 | 1.16 | AF |
| | E | 0.018 | 0.55 | 1.23 | 0.012 | 0.002 | 27.1 | 23.4 | 2.6 | 0.36 | 0.008 | 0.054 | | | 36.5 | 1.17 | AF |
| | F | 0.022 | 0.74 | 1.22 | 0.023 | 0.003 | 26.4 | 21.8 | 1.9 | 0.22 | 0.015 | 0.168 | 0.19 | | 35.4 | 1.05 | AF |
| | G | 0.016 | 0.23 | 1.41 | 0.016 | 0.001 | 26.1 | 22.1 | 2.3 | 0.31 | 0.012 | 0.107 | | 0.21 | 35.4 | 1.08 | AF |
| | H | 0.032 | 0.71 | 0.84 | 0.014 | 0.001 | 25.8 | 18.7 | 2.3 | 0.22 | 0.013 | 0.162 | 0.21 | 0.15 | 36.0 | 1.17 | AF |
| Comparative Example | I | *0.076* | 0.72 | 1.11 | 0.014 | 0.001 | *24.1* | 16.5 | 1.9 | 0.25 | 0.009 | 0.127 | | | *32.4* | 1.17 | AF |
| | J | 0.018 | 0.73 | 1.51 | 0.018 | 0.002 | 27.5 | *15.1* | 2.9 | 0.24 | 0.015 | 0.177 | | | 39.9 | *1.45* | FA |
| | K | 0.025 | 0.56 | 0.85 | 0.017 | 0.003 | *28.7* | 22.1 | *3.3* | 0.32 | 0.016 | 0.098 | | | 41.2 | *1.25* | FA |
| | L | 0.024 | 0.86 | 0.94 | 0.022 | 0.003 | 26.2 | 23.2 | 1.9 | 0.26 | 0.015 | *0.021* | | | *32.8* | 1.18 | AF |
| | M | 0.021 | 0.87 | 0.74 | 0.023 | 0.002 | 25.2 | 22.1 | 2.1 | 0.22 | 0.013 | 0.111 | | | *33.9* | 1.08 | AF |
| | N | 0.031 | 0.64 | 1.15 | 0.021 | 0.002 | 26.9 | 16.8 | 2.2 | 0.24 | 0.011 | 0.124 | | | 36.1 | *1.36* | FA |
| | O | 0.022 | 0.49 | 1.48 | 0.016 | 0.002 | 26.1 | 22.7 | 1.9 | 0.26 | 0.017 | 0.231 | | | 36.1 | *0.93* | A |

PI = Cr + 3.3 × Mo + 16 × N
Cr eq = Cr + Mo + 1.5 × Si
Ni eq = Ni + 0.5 × Mn + 30 × C + 30 × N
A: Solidification in austenite single phase,
AF: solidification in two phases of primary crystal austenite + ferrite,
FA: solidification in two phases of primary crystal ferrite + austenite V-notched test pieces regulated in JIS Z 2202 were sampled from the respective deposit-welded metals, and a Charpy impact test was conducted at a test temperature of −40° C. In addition, pitting corrosion test pieces were sampled from the surface layers of the deposit-welded metals, and pitting potentials were measured in a 3.5% NaCl solution at 40° C. according to a method regulated in JIS G 0577.

Table 6 shows the results of the Charpy impact test and the results of the pitting corrosion test when using the solid wires, and Table 7 shows the results of the Charpy impact test and the results of the pitting potential when using the flux-cored wires. The pitting potentials in Table 6 and Table 7 are potentials when a current density is 100 mA/cm$^2$, and white circles o of the pitting potentials mean that no pitting corrosion occurred and oxygen was generated due to electrolysis of water.

TABLE 6

| | Symbol | Charpy absorption energy (J) (−40° C.) | Pitting potential (V vs Ag—AgCl) |
|---|---|---|---|
| Present Invention | a | 97 | o |
| | b | 102 | o |
| | c | 95 | o |
| | d | 94 | o |
| | e | 101 | o |
| | f | 98 | o |
| | g | 95 | o |
| | h | 97 | o |
| | i | 96 | o |
| | j | 99 | o |

TABLE 6-continued

| Symbol | | Charpy absorption energy (J) (−40° C.) | Pitting potential (V vs Ag—AgCl) |
|---|---|---|---|
| Comparative Example | k | 78 | 0.327 |
| | l | 24 | ○ |
| | m | 19 | ○ |
| | n | 95 | 0.371 |
| | o | 94 | 0.452 |
| | p | 23 | ○ |
| | q | 124 | ○ |

In the example shown by symbol q, solidification cracks occurred.

TABLE 7

| Symbol | | Charpy absorption energy (J) (−40° C.) | Pitting potential (V vs Ag—AgCl) |
|---|---|---|---|
| Present Invention | A | 58 | ○ |
| | B | 51 | ○ |
| | C | 49 | ○ |
| | D | 55 | ○ |
| | E | 52 | ○ |
| | F | 53 | ○ |
| | G | 52 | ○ |
| | H | 49 | ○ |
| Comparative Example | I | 44 | 0.313 |
| | J | 13 | ○ |
| | K | 19 | ○ |
| | L | 51 | 0.309 |
| | M | 52 | 0.357 |
| | N | 15 | ○ |
| | O | 63 | ○ |

In the example shown by symbol O, solidification cracks occurred.

In Table 6 and Table 7, in the comparative example of symbol k and symbol l, C and Cr are out of the ranges, and PI values are low, so that pitting corrosion occurs. In the examples shown by symbol l and symbol J, the Ni content is low, and in the examples shown by symbol m and symbol K, Cr and Mo are above the regulated ranges, so that the ratios of the Cr equivalent/Ni equivalent exceed 1.2 and solidification is completed in the primary crystal ferrite phase, and the Charpy impact value is very low. In the examples shown by symbol n and symbol L, the N contents are low and the PI values are low, so that pitting corrosion occurs. In the examples shown by symbol o and symbol M, all elements are within the ranges; however, the PI values are low, so that pitting corrosion occurs. In the examples shown by symbol p and symbol N, all elements are within the ranges; however, the ratios of the Cr equivalent/N equivalent exceed 1.2 and solidification is completed in the primary crystal ferrite phase, so that the Charpy impact values are low. In the examples shown by symbol q and symbol 0 the Charpy impact values and pitting corrosion resistances are both favorable; however, the ratios of the Cr equivalent/Ni equivalent are less than 1.0, so that austenite single phase solidification is brought about and solidification cracks occur when welding.

On the other hand, in the examples of the exemplary embodiment of the present invention shown by symbols a through j and symbols A through H, the component contents and the relationship among the contents are within the ranges of the exemplary embodiment of the present invention, so that the Charpy impact values are higher in comparison with the comparative examples and pitting corrosion does not occur. The Charpy impact values of weld metals formed with the flux-cored wires of symbols A through H lower than the Charpy impact values of weld metals formed with the solid wires of symbols a though j are due to the differences in oxide amount in the weld metals.

Additional exemplary embodiments of the present invention will be further described below.

By using the austenitic stainless steels (plate thickness: 12.0 mm) whose components are shown in Table 8 as a base metal, grooves with a groove angle of 60° C. and a root face of 1 mm were formed. Table 9 shows components of the manufactured austenitic stainless steel welding wires. The wire diameter is 1.2 mm. By using these welding wires, weld joints were formed under a condition of a weld current: 150 through 200 A, an arc voltage: 23 through 31 V, a welding rate: 30 through 40 cm/min, and a 98% Ar+2% $O_2$ shield gas flow rate: 20 liters/min in the case of gas shield arc welding, and under a condition of a weld current: 180 through 220 A, an arc voltage: 11 through 14 V, a welding rate: 10 cm/min, and a 100% Ar shield gas flow rate: 15 liters/min in the case of tungsten arc welding.

TABLE 8

| | | Chemical Composition of Base Metal (Percent by Mass) | | | | | | | | | | | | | | | | |
|---|---|---|---|---|---|---|---|---|---|---|---|---|---|---|---|---|---|---|
| Symbol | | C | Si | Mn | P | S | Cr | Ni | Mo | Cu | Al | N | O | Ti | Nb | V | W | PIW | δ cal |
| Base metal | 1 | 0.021 | 0.49 | 0.48 | 0.020 | 0.001 | 25.3 | 17.9 | 2.5 | — | 0.020 | 0.235 | 0.004 | — | — | — | — | 37.3 | 2.2 |
| | 2 | 0.022 | 0.49 | 0.52 | 0.022 | 0.0006 | 24.9 | 18.4 | 2.5 | 0.45 | 0.032 | 0.240 | 0.003 | — | — | — | — | 37.0 | −1.0 |
| | 3 | 0.021 | 0.26 | 1.85 | 0.022 | 0.001 | 24.3 | 19.5 | 3.4 | 0.31 | 0.020 | 0.184 | 0.003 | 0.02 | 0.15 | — | — | 38.5 | −1.1 |

PIW = Cr + 3.3 (Mo + 0.5W) + 16N
δ cal = 2.9 (Cr + 0.3Si + Mo + 0.5W) − 2.6 (Ni + 0.3Mn + 0.25Cu + 32C + 20N) − 18

TABLE 9

| | | Chemical Composition of Sample Wire (Percent by Mass) | | | | | | | | | | | | | | |
|---|---|---|---|---|---|---|---|---|---|---|---|---|---|---|---|---|
| Symbol | | C | Si | Mn | P | S | Cr | Ni | Mo | Cu | Al | N | O | Ti | Nb | Ca | Mg |
| Present Invention | a | 0.022 | 0.72 | 1.76 | 0.016 | 0.002 | 25.3 | 22.1 | 2.6 | 0.25 | 0.015 | 0.127 | 0.001 | | | | |
| | b | 0.016 | 0.41 | 1.81 | 0.015 | 0.001 | 26.3 | 16.1 | 1.7 | 0.24 | 0.016 | 0.282 | 0.005 | | | | |
| | c | 0.021 | 0.36 | 2.01 | 0.021 | 0.002 | 25.5 | 17.1 | 2.1 | 0.26 | 0.015 | 0.251 | 0.002 | | | | |
| | d | 0.018 | 0.82 | 0.96 | 0.019 | 0.002 | 27.1 | 20.5 | 2.3 | 0.34 | 0.009 | 0.167 | 0.003 | | | | |
| | e | 0.025 | 0.59 | 1.34 | 0.012 | 0.003 | 27.2 | 23.3 | 2.7 | 0.18 | 0.013 | 0.052 | 0.002 | | | | |
| | f | 0.018 | 0.78 | 1.21 | 0.021 | 0.003 | 26.7 | 22.5 | 1.9 | 0.35 | 0.016 | 0.189 | 0.001 | 0.21 | | | |
| | g | 0.025 | 0.21 | 1.32 | 0.018 | 0.002 | 26.1 | 21.8 | 2.2 | 0.27 | 0.012 | 0.124 | 0.002 | | 0.26 | | |
| | h | 0.021 | 0.74 | 0.93 | 0.019 | 0.001 | 25.2 | 18.3 | 2.5 | 0.19 | 0.008 | 0.172 | 0.004 | 0.18 | 0.19 | | |
| | i | 0.031 | 0.88 | 2.27 | 0.017 | 0.002 | 25.9 | 16.7 | 2.7 | 0.41 | 0.015 | 0.241 | 0.002 | | | 0.002 | |
| | j | 0.023 | 0.71 | 0.86 | 0.022 | 0.003 | 27.6 | 23.5 | 1.8 | 0.21 | 0.011 | 0.098 | 0.005 | | | 0.001 | 0.001 |

TABLE 9-continued

| | | Chemical Composition of Sample Wire (Percent by Mass) | | | | | | | | | | | | | | |
|---|---|---|---|---|---|---|---|---|---|---|---|---|---|---|---|---|
| Symbol | | C | Si | Mn | P | S | Cr | Ni | Mo | Cu | Al | N | O | Ti | Nb | Ca | Mg |
| Comparative | k | 0.089 | 0.68 | 1.05 | 0.019 | 0.002 | 24.2 | 16.2 | 1.8 | 0.24 | 0.013 | 0.138 | 0.004 | | | | |
| Example | l | 0.024 | 0.54 | 1.44 | 0.022 | 0.002 | 27.8 | 15.3 | 2.8 | 0.31 | 0.015 | 0.162 | 0.002 | | | | |
| | m | 0.017 | 0.73 | 0.95 | 0.023 | 0.002 | 28.4 | 21.4 | 3.2 | 0.27 | 0.018 | 0.102 | 0.002 | | | | |
| | n | 0.018 | 0.85 | 0.88 | 0.022 | 0.003 | 26.4 | 23.4 | 2.1 | 0.21 | 0.014 | 0.020 | 0.003 | | | | |
| | o | 0.026 | 0.69 | 1.15 | 0.019 | 0.001 | 25.1 | 21.7 | 2.2 | 0.25 | 0.011 | 0.106 | 0.001 | | | | |
| | p | 0.021 | 0.51 | 1.19 | 0.018 | 0.002 | 27.1 | 17.2 | 2.5 | 0.22 | 0.015 | 0.114 | 0.002 | | | | |
| | q | 0.031 | 0.78 | 1.77 | 0.022 | 0.002 | 25.7 | 23.7 | 1.9 | 0.26 | 0.015 | 0.315 | 0.002 | | | | |

Next, from the respective weld joints, weld metal components were analyzed, and V-notched test pieces regulated in JIS Z 2202 were sampled so that notches were positioned at the weld metals, and a Charpy impact test was conducted at a test temperature of −40° C. Pitting corrosion test pieces were sampled from the surface layers of the weld metals, and pitting potentials were measured in a 3.5% NaCl solution at 40° C. according to a method regulated in JIS G 0577.

Table 10 and Table 11 show the combinations of the used base metals and welding wires, welding methods, PI values and ratios of the Cr equivalent/Ni equivalent calculated by the weld metal components, solidification modes, and the results of the Charpy impact test and the results of the pitting corrosion test. Concerning the welding methods shown in Table 10, GMAW indicates gas shield arc welding, GTAW indicates tungsten arc welding, and a solidification mode in which solidification is completed in an austenite single phase is indicated as A, a solidification mode in which solidification is completed in two phases of primary crystal austenite+ferrite is indicated as AF, and a solidification mode in which solidification is completed in two phases of primary crystal ferrite+austenite is indicated as FA. The pitting potentials shown in Table 11 indicate potentials when the current density is 100 mA/cm$^2$, and the white circles o of the pitting potentials mean that pitting corrosion does not occur and oxygen is generated due to electrolysis of water.

In Table 10 and Table 11, in the comparative examples of symbol K, symbol N, and symbol 0, the PI values are lower than 35 as the range of the exemplary embodiment of the present invention, so that pitting corrosion occurs. In the comparative examples of symbol L, symbol M, and symbol P, the ratios of the Cr equivalent/Ni equivalent are more than the upper limit of 1.2 of the range of the exemplary embodiment of the present invention and bring about a primary crystal ferrite phase solidification, so that the Charpy impact values significantly lower. In the comparative example of symbol Q, the Charpy impact value and the corrosion resistance are both favorable; however, the ratio of the Cr equivalent/Ni equivalent exceeds the lower limit of 0.85 of the range of the exemplary embodiment of the present invention, so that solidification cracks occur when welding. On the other hand, in the examples of the exemplary embodiment of the present invention of symbols A through J, the component contents in the welding wires and the relationship of the respective components in the weld metals are within the ranges of the exemplary embodiment of the present invention, so that in comparison with the comparative examples, the Charpy impact values are higher and pitting corrosion does not occur. In the examples shown by symbols A through J, the Charpy impact values of gas shield arc weld metal lower than the Charpy impact values of tungsten arc weld metals are due to a high level of oxides in the weld metals.

TABLE 10

| | Symbol | Base Metal | Welding Wire | Welding Method | Chemical Composition of Weld Metal (Percent by Mass) | | | | | | | | |
|---|---|---|---|---|---|---|---|---|---|---|---|---|---|
| | | | | | C | Si | Mn | P | S | Cr | Ni | Mo | Cu |
| Present Invention | A | 1 | a | GMAW | 0.022 | 0.69 | 1.57 | 0.017 | 0.002 | 25.3 | 21.5 | 2.6 | 0.21 |
| | B | 1 | b | GTAW | 0.017 | 0.42 | 1.61 | 0.016 | 0.001 | 26.2 | 16.4 | 1.8 | 0.20 |
| | C | 2 | c | GTAW | 0.021 | 0.35 | 1.99 | 0.021 | 0.002 | 25.3 | 17.5 | 2.3 | 0.27 |
| | D | 1 | d | GMAW | 0.018 | 0.77 | 0.89 | 0.019 | 0.002 | 26.8 | 20.1 | 2.3 | 0.29 |
| | E | 2 | e | GMAW | 0.024 | 0.54 | 1.42 | 0.014 | 0.003 | 26.8 | 22.7 | 2.8 | 0.20 |
| | F | 1 | f | GMAW | 0.018 | 0.74 | 1.10 | 0.021 | 0.003 | 26.5 | 21.8 | 2.0 | 0.30 |
| | G | 1 | g | GMAW | 0.024 | 0.25 | 1.19 | 0.018 | 0.002 | 26.0 | 21.2 | 2.2 | 0.23 |
| | H | 2 | h | GMAW | 0.021 | 0.67 | 1.07 | 0.019 | 0.001 | 25.1 | 18.5 | 2.6 | 0.21 |
| | I | 2 | I | GTAW | 0.030 | 0.79 | 2.21 | 0.018 | 0.002 | 25.7 | 17.1 | 2.8 | 0.40 |
| | J | 1 | j | GMAW | 0.023 | 0.68 | 0.80 | 0.022 | 0.003 | 27.3 | 22.7 | 1.9 | 0.18 |
| Comparative Example | K | 1 | k | GMAW | 0.079 | 0.65 | 0.96 | 0.019 | 0.002 | 24.4 | 16.5 | 1.9 | 0.20 |
| | L | 1 | L | GTAW | 0.024 | 0.53 | 1.30 | 0.022 | 0.002 | 27.4 | 15.7 | 2.8 | 0.26 |
| | M | 1 | M | GMAW | 0.018 | 0.69 | 0.88 | 0.023 | 0.002 | 27.9 | 20.9 | 3.1 | 0.23 |
| | N | 2 | N | GMAW | 0.018 | 0.76 | 1.03 | 0.022 | 0.003 | 26.1 | 22.8 | 2.3 | 0.23 |
| | O | 2 | O | GMAW | 0.025 | 0.63 | 1.26 | 0.019 | 0.001 | 25.0 | 21.4 | 2.4 | 0.26 |

TABLE 10-continued

| | | | | | | | | | | | | | |
|---|---|---|---|---|---|---|---|---|---|---|---|---|---|
| P | 1 | P | GMAW | 0.021 | 0.51 | 1.08 | 0.018 | 0.002 | 26.8 | 17.3 | 2.5 | 0.19 | |
| Q | 1 | Q | GTAW | 0.030 | 0.74 | 1.81 | 0.022 | 0.002 | 25.6 | 23.5 | 2.0 | 0.22 | |

| | | Chemical Composition of Weld Metal (Percent by Mass) | | | | | | | | |
|---|---|---|---|---|---|---|---|---|---|---|
| Symbol | | Al | N | O | Ti | Nb | Ca | Mg | PI | Creq/Ni eq | Solidification Mode |
| Present Invention | A | 0.016 | 0.143 | 0.041 | — | — | — | — | 36.1 | 1.06 | AF |
| | B | 0.017 | 0.275 | 0.005 | — | — | — | — | 36.6 | 1.10 | AF |
| | C | 0.016 | 0.241 | 0.002 | 0.003 | 0.023 | — | — | 36.7 | 1.07 | AF |
| | D | 0.011 | 0.177 | 0.033 | — | — | — | — | 37.4 | 1.15 | AF |
| | E | 0.014 | 0.072 | 0.042 | 0.003 | 0.023 | — | — | 37.2 | 1.15 | AF |
| | F | 0.017 | 0.196 | 0.041 | 0.179 | — | — | — | 36.2 | 1.03 | AF |
| | G | 0.013 | 0.141 | 0.042 | — | 0.221 | — | — | 35.6 | 1.07 | AF |
| | H | 0.010 | 0.174 | 0.034 | 0.156 | 0.184 | — | — | 36.5 | 1.15 | AF |
| | I | 0.016 | 0.232 | 0.002 | 0.003 | 0.023 | 0.002 | — | 38.6 | 1.14 | AF |
| | J | 0.012 | 0.119 | 0.035 | — | — | 0.001 | 0.001 | 35.4 | 1.11 | AF |
| Comparative Example | K | 0.014 | 0.153 | 0.044 | — | — | — | — | 33.1 | 1.14 | AF |
| | L | 0.016 | 0.173 | 0.002 | — | — | — | — | 39.3 | 1.39 | FA |
| | M | 0.018 | 0.122 | 0.042 | — | — | — | — | 40.1 | 1.26 | FA |
| | N | 0.015 | 0.045 | 0.043 | 0.003 | 0.023 | — | — | 34.4 | 1.17 | AF |
| | O | 0.012 | 0.118 | 0.051 | 0.003 | 0.023 | — | — | 34.7 | 1.08 | AF |
| | P | 0.016 | 0.132 | 0.042 | — | — | — | — | 37.2 | 1.34 | FA |
| | Q | 0.016 | 0.293 | 0.002 | — | — | — | — | 36.9 | 0.84 | A |

In the example shown by symbol Q, solidification cracks occurred.
PI = Cr + 3.3 × Mo + 16 × N
Cr eq = Cr + Mo + 1.5 × Si
Ni eq = Ni + 0.5 × Mn + 30 × C + 30 × N
A: Solidification in austenite single phase,
AF: Solidification in two phases of primary austenite + ferrite,
FA: Solidification in two phases of primary crystal ferrite + austenite

TABLE 11

| Symbol | | Charpy absorption energy (J) (−40° C.) | Pitting potential (V vs Ag—AgCl) |
|---|---|---|---|
| Present Invention | A | 95 | ○ |
| | B | 137 | ○ |
| | C | 145 | ○ |
| | D | 91 | ○ |
| | E | 97 | ○ |
| | F | 92 | ○ |
| | G | 89 | ○ |
| | H | 95 | ○ |
| | I | 132 | ○ |
| | J | 93 | ○ |
| Comparative Example | K | 73 | 0.338 |
| | L | 31 | ○ |
| | M | 17 | ○ |
| | N | 88 | 0.315 |
| | O | 91 | 0.394 |
| | P | 19 | ○ |
| | Q | 151 | ○ |

Next, in a combination of the base metal shown by symbol 3 and the welding wire shown by symbol a, weld joints were formed under the welding conditions shown in Table 12. Symbol "–" in the section of pulsed arc welding means that welding was performed with a direct current power source. For the respective weld joints, radiograph examination regulated in JIS Z 3106 was performed to investigate the occurrence of blow holes. Thereafter, in the same manner as described above, for the respective weld joints, analysis of the weld metal components, a Charpy impact test (−40° C.) of the weld metal, and measurement of pitting potentials were performed.

Table 13 shows PI values and the ratios of the Cr equivalent/Ni equivalent calculated from the weld metal components, solidification modes, the results of the Charpy impact test, the results of the pitting potential, and the results of the radiograph examination. The results of the radiograph examination shown in Table 13 indicate the numbers of blow holes in the field of view of 10 mm×10 mm in conformity with JIS Z 3106.

TABLE 12

| | | | | | Pulsed Arc Welding | | |
|---|---|---|---|---|---|---|---|
| | Symbol | Welding Method | Heat Input (J/cm) | Dilution Ratio (%) | Current Difference between Peak and Base (A) | Duty Ratio | Frequency (Hz) |
| Present Invention | I | GMAW | 8,400 | 21 | — | — | — |
| | II | GMAW | 17,900 | 27 | — | — | — |
| | III | GTAW | 6,400 | 13 | — | — | — |
| | IV | GTAW | 15,600 | 19 | — | — | — |
| | V | GMAW | 15,900 | 28 | 60 | 0.4 | 50 |
| | VI | GTAW | 12,600 | 20 | 30 | 0.5 | 15 |

TABLE 12-continued

| | | | | | Pulsed Arc Welding | | |
|---|---|---|---|---|---|---|---|
| Symbol | | Welding Method | Heat Input (J/cm) | Dilution Ratio (%) | Current Difference between Peak and Base (A) | Duty Ratio | Frequency (Hz) |
| Comparative Example | VII | GMAW | 25,400 | 34 | — | — | — |
| | VIII | GTAW | 24,200 | 27 | — | — | — |
| | IX | GTAW | 32,100 | 33 | — | — | — |
| | X | GMAW | 15,900 | 28 | 10 | 0.1 | 5 |
| | XI | GTAW | 32,100 | 35 | 10 | 0.7 | 5 |

TABLE 13

| Symbol | | PI | Creq/ Nieq | Solidification Mode | Charpy absorption energy (J) (−40° C.) | Pitting potential (V vs Ag—AgCl) | Radiograph Examination (Number/100 mm$^2$) | Remarks |
|---|---|---|---|---|---|---|---|---|
| Present Invention | I | 35.9 | 1.05 | AF | 95 | o | 2 | |
| | II | 36.1 | 1.18 | AF | 90 | o | 3 | |
| | III | 35.9 | 1.04 | AF | 145 | o | 1 | |
| | IV | 35.9 | 1.05 | AF | 132 | o | 2 | |
| | V | 36.1 | 1.18 | AF | 89 | o | 0 | |
| | VI | 35.9 | 1.05 | AF | 128 | o | 0 | |
| Comparative Example | VII | 36.3 | 1.27 | FA | 29 | o | 3 | |
| | VIII | 36.0 | 1.19 | AF | 91 | o | 2 | Solidification cracks occurred |
| | IX | 36.3 | 1.26 | FA | 32 | o | 2 | Solidification cracks occurred |
| | X | 36.1 | 1.18 | AF | 87 | o | 3 | |
| | XI | 36.3 | 1.26 | FA | 30 | o | 2 | |

PI = Cr + 3.3 × Mo + 16 × N
Cr eq = Cr + Mo + 1.5 × Si
Ni eq = Ni + 0.5 × Mn + 30 × C + 30 × N
A: Solidification in austenite single phase,
AF: Solidification in two phases of primary austenite + ferrite,
FA: Solidification in two phases of primary crystal ferrite + austenite In the comparative examples of symbol VII and symbol IX, the weld heat inputs exceed 20,000 J/cm of the range of the exemplary embodiment of the present invention, and the base metal dilution ratios are also over 30% of the range of the exemplary embodiment of the present invention, so that the weld metal components pass into the base metal component side, and the ratios of the Cr equivalent/Ni equivalent exceed 1.2 as the upper limit of the range of the exemplary embodiment of the present invention. Therefore, this brings about a primary crystal ferrite phase solidification and significantly lowers the Charpy impact values. In the example shown by symbol IX, the weld heat input is high, so that weld solidification cracks occurs. In the comparative example of symbol VIII, the weld heat input exceeds 20,000 J/cm; however, the base metal dilution ratio is within the range of the exemplary embodiment of the present invention, so that the ratio of the Cr equivalent/Ni equivalent also falls within the range of the exemplary embodiment of the present invention, so that the Charpy impact value is favorable. However; due to the high weld heat input, the weld bead shape becomes convex and weld solidification cracks occur. On the other hand, in the examples of the exemplary embodiments of the present invention shown by symbols I through IV, the weld heat inputs and base metal dilution ratios are within the ranges of the exemplary embodiments of the present invention, so that the Charpy impact values are higher than those in the comparative examples.

In the examples of the exemplary embodiments of the present invention shown by symbol V and symbol VI, pulsed arc welding was performed by setting the weld heat inputs and base metal dilution ratios to almost the same levels as those in the examples of the exemplary embodiments of the present invention shown by symbol II and symbol IV. In the examples shown by symbol II and symbol IV, welding was performed with a direct current power source, so that blow holes of the first kind and first class or second class according to the JIS Z 3106 judging criteria were observed; however, in the examples shown by symbol V and symbol VI in which pulsed arc welding was performed under the pulse condition within the range of the exemplary embodiments of the present invention, blow holes were not observed. On the other hand, in the comparative examples of symbol X and symbol XI, pulsed arc welding was performed under a pulse condition out of the range of the exemplary embodiments of the present invention, and the number of blow holes was not different from that of symbol II and symbol IX in which welding was performed with a direct current power source with almost the same heat input. Therefore, by performing pulsed arc welding under a pulse condition within the range of the exemplary embodiment of the present invention, blow hole reduction is realized.

The exemplary embodiments of the present invention make it possible to manufacture a weld structure having a weld metal with excellent low-temperature toughness and excellent pitting corrosion resistance and crevice corrosion resistance in a seawater environment, and reliability of a weld zone of a stainless steel hull structure whose safety against collision and corrosion due to seawater is an issue can be secured for a long period of time. In this view, the economic efficiency is increased by minimizing the maintenance of the weld zone and soundness of the weld structure is significantly improved, and the application of the present invention significantly contributes to industrial development in the field of marine structures and shipbuilding.

The exemplary embodiments of the present invention are described above; however, the present invention is not limited to these embodiments. Constructional addition, omission, substitution, and other variations are possible without deviating from the spirit of the present invention. The present invention is not limited by the description given above, and is limited only by the accompanying claims.

Indeed, the foregoing merely illustrates the exemplary principles of the present invention. Various modifications and alterations to the described embodiments will be apparent to those skilled in the art in view of the teachings herein. It will thus be appreciated that those skilled in the art will be able to devise numerous modification to the exemplary embodiments of the present invention which, although not explicitly shown or described herein, embody the principles of the invention and are thus within the spirit and scope of the invention. All publications, applications and patents cited above are incorporated herein by reference in their entireties.

What is claimed is:

1. A welding wire for austenitic stainless steel welding, comprising:

at least one portion containing, about, C, 0.005 through 0.05%, Si: 0.1 through 1.0%, Mn: 0.1 through 3.5%, Cr: 25.0 through 28.0%, Ni: 16.0 through 23.9%, Mo: 1.6 through 3.0%, Cu: 0.1 through 0.5%, Al: 0.001 through 0.02%, and N: 0.03 through 0.50% in percent by mass with respect to a total mass of the wire in a solid wire, an outer coat, or an outer coat and a flux, and furthermore, limiting P to between about 0.03% to greater than 0% and limiting S to between about 0.005% to greater than 0%, and in a case of a solid wire, limiting O to between about 0.03 to greater than 0%, having a ratio of a Cr equivalent to Ni equivalent (Cr equivalent/Ni equivalent) defined by the following equations (1) and (2) within a range between about 0.85 and 1.2, and a PI value of about 35 or more defined by the following equation (3), the remainder being iron and unavoidable impurities other than P, O, and S:

$$\text{Cr equivalent}=\text{Cr}+\text{Mo}1+1.5\times\text{Si} \quad (1)$$

$$\text{Ni equivalent}=\text{Ni}+0.5\times\text{Mn}+30\times\text{C}+30\times\text{N (N is 0.03\% through 0.30\%), or}$$

$$\text{Ni equivalent}=\text{Ni}+0.5\times\text{Mn}+30\times\text{C}+19.5\times\text{N (N is more than 0.30\% and equal to or less than 0.50\%)} \quad (2)$$

$$\text{PI value}=\text{Cr}+3.3\times\text{Mo}+16\times\text{N (N is 0.03\% through 0.30\%), or}$$

$$\text{PI value}=\text{Cr}+3.3\times\text{Mo}+10.4\times\text{N (N is more than 0.30\% and equal to or less than 0.50\%)} \quad (3)$$

wherein the Cr, Mo, Si, Ni, Mn, C, and N indicate contents (percent by mass) of the at least one portion.

2. The welding wire for austenitic stainless steel welding according to claim 1, wherein the at least one portion further contains at least one of, about, Ti: 0.01 through 0.3%, Nb: 0.01 through 0.3%, Ca: 0.0005 through 0.0050%, or Mg: 0.0005 through 0.0050% in percent by mass.

3. An austenitic stainless steel welding structure comprising:

at least one austenitic stainless steel base metal portion containing, about, C, 0.005 through 0.03%, Si: 0.1 through 1.5%, Mn: 0.1 through 3.0%, Ni: 15.0 through 21.0%, Cr: 22.0 through 28.0%, Mo: 1.5 through 3.5%, N: 0.15 through 0.35%, W: between 3.0% to greater than 0%, Al: 0.005 through 0.1% to greater than 0% in percent by mass, limiting O to between 0.007% to greater than 0%, limiting P to 0.05% to greater than 0%, and limiting S to 0.003% to greater than 0%, having a PIW value defined by the following equation (4) within a range between about 35 and 40, and a δ cal value defined by the following equation (5) within a range between about −6 and +4, the remainder being iron and unavoidable impurities; and at least one weld metal portion that is formed at a weld zone, containing, about, C: 0.005 through 0.05%, Si: 0.1 through 1.0%, Mn: 0.1 through 3.5%, Cr: 25.0 through 28.0%, Ni: 16.0 through 23.9%, Mo: 1.6 through 3.0%, Cu: 0.1 through 0.5%, Al: 0.001 through 0.02%, and N: 0.03 through 0.35% in percent by mass, limiting O to between 0.10% to greater than 0%, P to between 0.03% to greater than 0%, and limiting S to between 0.005% to greater than 0%, having a ratio of a Cr equivalent to Ni equivalent (Cr equivalent/Ni equivalent) within a range between about 0.85 and 1.2 defined by the following equations (6) and (7), and having a PI value of about 35 or more defined by the following equation (8), the remainder being iron and unavoidable impurities other than P, O, and S:

$$\text{PIW value}=\text{Cr}+3.3(\text{Mo}+0.5\text{W})+16\text{N} \quad (4)$$

$$\delta \text{ cal value}=2.9(\text{Cr}+0.3\text{Si}+\text{Mo}+0.5\text{W})-2.6(\text{Ni}+0.3\text{Mn}+0.25\text{Cu}+32\text{C}+20\text{N})-18 \quad (5)$$

wherein the Cr, Mo, W, N, Si, Mn, Cu, and C indicate the contents (percent by mass) of the respective components in the at least one steel material portion, and $$\text{Cr equivalent}=\text{Cr}+\text{Mo}+1.5\times\text{Si} \quad (6)$$

$$\text{Ni equivalent}=\text{Ni}+0.5\times\text{Mn}+30\times\text{C}+30\times\text{N} \quad (7)$$

$$\text{PI value}=\text{Cr}+3.3\times\text{Mo}+16\times\text{N} \quad (8)$$

wherein the Cr, Mo, Si, Ni, Mn, C, and N indicate contents (percent by mass) of the at least one weld metal portion.

4. The austenitic stainless steel welding structure according to claim 3, wherein the at least one base metal portion further contains at least one of, about, Cu: 0.1 through 2.0%, Ti: 0.003 through 0.03%, Nb: 0.02 through 0.20%, or V: 0.05 through 0.5%.

5. The austenitic stainless steel welding structure according to claim 3, wherein the at least one weld metal portion further contains at least one of, about, Ti: 0.01 through 0.3%, Nb: 0.01 through 0.3%, Ca: 0.0005 through 0.0050%, or Mg: 0.0005 through 0.0050% in percent by mass.

6. An austenitic stainless steel welding structure comprising:

at least one austenitic stainless steel base metal containing, about, C: 0.005 through 0.03%, Si: 0.1 through 1.5%, Mn: 0.1 through 3.0%, Ni: 15.0 through 21.0%, Cr: 22.0 through 28.0%, Mo: 1.5 through 3.5%, N, 0.15 through 0.35%, Al: 0.005 through 0.1% to greater than 0% in percent by mass, limiting O to between 0.007% to greater than 0%, limiting P to between 0.05% to greater than 0%, and limiting S to between 0.003% to greater than 0%, further containing one, two or more of Cu: 0.1 through 2.0%, Ti: 0.003 through 0.03%, Nb: 0.02 through 0.20%, V: 0.05 through 0.5%, and W: 0.3 through 3.0%, having a PIW value defined by the following equation (4) within a range between about 35 and 40, and a δ cal value defined by the following equation (5) within a range between about −6 and +4, the remainder being iron and unavoidable impurities other than P, O, and S, and at least one weld metal portion that is formed at a weld zone, containing, about, C: 0.005 through 0.05%, Si: 0.1 through 1.0%, Mn: 0.1 through 3.5%, Cr: 25.0 through 28.0%, Ni: 16.0 through 23.9%, Mo: 1.6 through 3.0%, Cu: 0.1 through 0.5%, Al: 0.001 through 0.02%, and N: 0.03 through 0.35% in percent by mass, limiting O to between 0.10% to greater than 0%, limiting P to between 0.03% to greater than 0%, and limiting S to between 0.005% to greater than 0%, further containing one, two, or more of Ti: 0.01 through 0.3%, Nb: 0.01 through 0.3%, Ca: 0.0005 through 0.0050%, and Mg: 0.0005 through 0.0050%, having a ratio of a Cr equivalent to Ni equivalent (Cr equivalent/Ni equivalent) within a range between about 0.85 and 1.2 defined by the following equations (6) and (7), and having a PI value of about 35 or more defined by the following equation (8), the remainder being iron and unavoidable impurities other than P, O, and S:

$$\text{PIW value} = Cr + 3.3(Mo + 0.5W) + 16N \tag{4}$$

$$\delta \text{ cal value} = 2.9(Cr + 0.3S + Mo + 0.5W) - 2.6(Ni + 0.3Mn + 0.25Cu + 32C + 20N) - 18 \tag{5}$$

wherein the Cr, Mo, W, N, Si, Ni, Mn, Cu, and C indicate contents (percent by mass) of the respective components in the at least one steel material portion, and $$\text{Cr equivalent} = Cr + Mo + 1.5 \times Si \tag{6}$$

$$\text{Ni equivalent} = +0.5 \times Mn + 30 \times C + 30 \times N \tag{7}$$

$$\text{PI value} = Cr + 3.3 \times Mo + 16 \times N \tag{8}$$

wherein the Cr, Mo, Si, Ni, Mn, C, and N indicate contents (percent by mass) of the at least one weld metal portion.

7. The austenitic stainless steel welding structure according to claim 3, wherein the at least one weld metal portion is formed by using at least one of a gas shield arc welding procedure or a tungsten arc welding procedure.

8. An austenitic stainless steel welding structure comprising:
at least one austenitic stainless steel base metal portion containing, about, C: 0.005 through 0.03%, Si: 0.1 through 1.5%, Mn: 0.1 through 3.0%, Ni: 15.0 through 21.0%, Cr: 22.0 through 28.0%, Mo: 1.5 through 3.5%, N, 0.15 through 0.35%, Al: 0.005 through 0.1% to greater than 0% in percent by mass, limiting O to between 0.007% to greater than 0%, limiting P to 0.05% to greater than 0%, and limiting S to between 0.003% to greater than 0%, further containing one, two or more of Cu: 0.1 through 2.0%, Ti: 0.003 through 0.03%, Nb: 0.02 through 0.20%, V: 0.05 through 0.5%, and W: 0.3 through 3.0%, having a PIW value defined by the following equation (4) within a range between about 35 and 40, and a δ cal value defined by the following equation (5) within a range between about −6 and +4, the remainder being iron and unavoidable impurities other than P, O, and S; and
at least one weld metal portion that is formed at a weld zone by using at least one of a gas shield arc welding procedure or a tungsten arc welding procedure, containing, about, C: 0.005 through 0.05%, Si: 0.1 through 1.0%, Mn: 0.1 through 3.5%, Cr: 25.0 through 28.0%, Ni: 16.0 through 23.9%, Mo: 1.6 through 3.0%, Cu: 0.1 through 0.5%, Al: 0.001 through 0.02%, and N: 0.03 through 0.35% in percent by mass, limiting O to between 0.10% to greater than 0%, limiting P to between 0.03% to greater than 0%, and limiting S to between 0.005% to greater than 0%, and having a ratio of a Cr equivalent to Ni equivalent (Cr equivalent/Ni equivalent) within a range between about 0.85 and 1.2 defined by the following equations (6) and (7), having a PI value of about 35 or more defined by the following equation (8), the remainder being iron and unavoidable impurities other than P, O, and S:

$$\text{PIW value} = Cr + 3.3(Mo + 0.5W) + 16N \tag{4}$$

$$\delta \text{ cal value} = 2.9(Cr + 0.3Si + Mo + 0.51W) - 2.6(Ni + 0.3Mn + 0.25Cu + 32C + 20N) - 18 \tag{5}$$

wherein the Cr, Mo, W, N, Si, Ni, Mn, Cu, and C indicate contents (percent by mass) of the respective components in the at least one steel material portion, and $$\text{Cr equivalent} = Cr + Mo + 1.5 \times Si \tag{6}$$

$$\text{Ni equivalent} = Ni + 0.5 \times Mn + 30 \times C + 30 \times N \tag{7}$$

$$\text{PI value} = Cr + 3.3 \times Mo + 16 \times N \tag{8}$$

wherein the Cr, Mo, Si, Ni, Mn, C, and N indicate contents (percent by mass) of the at least one weld metal portion.

9. An austenitic stainless steel welding structure comprising:
at least one austenitic stainless steel base metal portion containing, about, C: 0.005 through 0.03%, Si: 0.1 through 1.5%, Mn: 0.1 through 3.0%, Ni: 15.0 through 21.0%, Cr: 22.0 through 28.0%, Mo: 1.5 through 3.5%, N: 0.15 through 0.35%, W: between 3.0% to greater than 0%, Al: 0.005 through 0.1% to greater than 0% in percent by mass, limiting O to between 0.007% to greater than 0%, limiting P to 0.05% to greater than 0%, and limiting S to between 0.003% to greater than 0%, having a PIW value defined by the following equation (4) within a range between about 35 and 40, and a δ cal value defined by the following equation (5) in a range between about −6 and +4, the remainder being iron and unavoidable impurities other than P, O, and S; and
at least one weld metal portion that is formed at a weld zone by using at least one of a gas shield arc welding procedure or a tungsten arc welding procedure, containing, about, C: 0.005 through 0.05%, Si: 0.1 through 1.0%, Mn: 0.1 through 3.5%, Cr: 25.0 through 28.0%, Ni: 16.0 through 23.9%, Mo: 1.6 through 3.0%, Cu: 0.1 through 0.5%, Al: 0.001 through 0.02%, and N: 0.03 through 0.35% in percent by mass, limiting O to between 0.10% to greater than 0%, limiting P to between 0.03% to greater than 0%, and limiting S to between 0.005% to greater than 0%, further containing one, two, or more of Ti: 0.01 through 0.3%, Nb: 0.01 through 0.3%, Ca: 0.0005 through 0.0050%, and Mg: 0.0005 through 0.0050%, having a ratio of a Cr equivalent to Ni equivalent (Cr equivalent/Ni equivalent) within a range between about 0.85 and 1.2 defined by the following equations (6) and (7), and having a PI value of about 35 or more defined by the following equation (8), the remainder being iron and unavoidable impurities other than P, O, and S:

$$\text{PIW value} = Cr + 3.3(Mo + 0.5W) + 16N \tag{4}$$

$$\delta \text{ cal value} = 2.9(Cr + 0.3Si + Mo + 0.5W) - 2.6(Ni + 0.3Mn + 0.25Cu + 32C + 20N) - 18 \tag{5}$$

wherein the Cr, Mo, W, N, Si, Mn, Cu, and C indicate contents (percent by mass) of the respective components in the at least one steel material portion, and $$\text{Cr equivalent} = Cr + Mo + 1.5 \times Si \tag{6}$$

$$\text{Ni equivalent} = Ni + 0.5 \times Mn + 30 \times C + 30 \times N \tag{7}$$

$$\text{PI value} = Cr + 3.3 \times Mo + 16 \times N \tag{8}$$

wherein the Cr, Mo, Si, Ni, Mn, C, and N indicate contents (percent by mass) of the at least one weld metal portion.

10. The austenitic stainless steel welding structure according to claim 6, wherein the at least one weld metal portion is formed by using at least one of a gas shield arc welding procedure or a tungsten arc welding procedure.

11. An austenitic stainless steel welding structure comprising:
at least one austenitic stainless steel base metal portion containing, about, C: 0.005 through 0.03%, Si: 0.1 through 1.5%, Mn: 0.1 through 3.0%, Ni: 15.0 through 21.0%, Cr: 22.0 through 28.0%, Mo: 1.5 through 3.5%, N: 0.15 through 0.35%, W: between 3.0% to greater than 0%, Al: 0.005 through 0.1% to greater than 0% in percent by mass, limiting O to between 0.007% or less (excluding 0%), limiting P to between 0.05% to greater than 0%, and limiting S to between 0.003% to greater than 0%, having a PIW value defined by the following equation (4) within a range between about 35 and 40, and a δ cal value defined by the following equation (5) within a range between about −6 and +4, the remainder being iron and unavoidable impurities other than P, O, and S; and at least one weld metal portion that is formed at a weld zone by using at least one of a gas shield arc welding procedure or a tungsten arc welding procedure under welding conditions such that a weld heat input Q defined by the following equation (9) is between 20,000 J/cm to greater than 0 and a base metal dilution ratio D defined by the following equation (10) is between 30% to greater than 0%, containing, about, C: 0.005 through 0.05%, Si: 0.1 through 1.0%, Mn: 0.1 through 3.5%, Cr: 25.0 through 28.0%, Ni: 16.0 through 23.9%, Mo: 1.6 through 3.0%, Cu: 0.1 through 0.5%, Al: 0.001 through 0.02%, and N: 0.03 through 0.35% in percent by mass, limiting O to between 0.10% to greater than 0%, limiting P to between 0.03% to greater than 0%, and limiting S to between 0.005% to greater than 0%, having a ratio of a Cr equivalent to Ni equivalent (Cr equivalent/Ni equivalent) within a range between about 0.85 and 1.2 defined by the following equations (6) and (7), and having a PI value of about 35 or more defined by the following equation (8), the remainder being iron and unavoidable impurities other than P, O, and S:

$$\text{PIW value} = Cr + 3.3(Mo + 0.5W) + 16N \quad (4)$$

$$\delta \text{ cal value} = 2.9(Cr + 0.3Si + Mo + 0.5W) - 2.6(Ni + 0.3Mn + 0.25Cu + 32C + 20N) - 18 \quad (5)$$

wherein the Cr, Mo, W, N, Si, Ni, Mn, Cu, and C indicate contents (percent by mass) of the respective components in the at least one steel material portion, and $$\text{Cr equivalent} = Cr + Mo + 1.5 \times Si \quad (6)$$

$$\text{Ni equivalent} = Ni + 0.5 \times Mn + 30 \times C + 30 \times N \quad (7)$$

$$\text{PI value} = Cr + 3.3 \times Mo + 16 \times N \quad (8)$$

$$Q = \text{welding current} \times \text{welding voltage} \times \text{welding time} / \text{welding length} \quad (9)$$

$$D = \text{melting volume of base metal/total weld metal volume} \quad (10)$$

wherein the Cr, Mo, Si, Ni, Mn, C, and N indicate contents (percent by mass) of the at least one weld metal portion.

12. The austenitic stainless steel welding structure according to claim 8, wherein the at least one weld metal portion is formed under the welding conditions such that a welding heat input Q defined by the following equation (9) is about between 20,000 J/cm to greater than 0 and a base metal dilution ratio D defined by the following (10) is about between 30% to greater than 0:

$$Q = \text{welding current} \times \text{welding voltage} \times \text{welding time} / \text{welding length} \quad (9)$$

$$D = \text{melting volume of base metal/total weld metal volume} \quad (10)$$

13. The austenitic stainless steel welding structure according to claim 9, wherein the at least one weld metal portion is formed under the welding conditions such that a welding heat input Q defined by the following equation (9) is about between 20,000 J/cm to greater than 0 and a base metal dilution ratio D defined by the following (10) is about between 30% to greater than 0:

$$Q = \text{welding current} \times \text{welding voltage} \times \text{welding time} / \text{welding length} \quad (9)$$

$$D = \text{melting volume of base metal/total weld metal volume} \quad (10)$$

14. An austenitic stainless steel welding structure comprising:

at least one austenitic stainless steel base metal portion containing, about, C: 0.005 through 0.03%, Si: 0.1 through 1.5%, Mn: 0.1 through 3.0%, Ni: 15.0 through 21.0%, Cr: 22.0 through 28.0%, Mo: 1.5 through 3.5%, N: 0.15 through 0.35%, Al: 0.005 through 0.1% to greater than 0% in percent by mass, limiting O to between 0.007%, limiting P to between 0.05% to greater than 0%, and limiting S to between 0.003% to greater than 0%, further containing one, two, or more of Cu: 0.1 through 2.0%, Ti: 0.003 through 0.03%, Nb: 0.02 through 0.20%, V: 0.05 through 0.5%, and W: 0.3 through 3.0%, having a PIW value defined by the following equation (4) within a range between about 35 and 40, and a δ cal value defined by the following equation (5) within a range between about −6 and +4, the remainder being iron and unavoidable impurities other than P, O, and S; and at least one weld metal portion that is formed at a weld zone by using at least one of a gas shield arc welding procedure or a tungsten arc welding procedure under welding conditions such that a weld heat input Q defined by the following equation (9) is about 20,000 J/cm or less (excluding 0) and a base metal dilution ratio D defined by the following equation (10) is about between 30% to greater than 0, containing, about, C: 0.005 through 0.05%, Si: 0.1 through 1.0%, Mn: 0.1 through 3.5%, Cr: 25.0 through 28.0%, Ni: 16.0 through 23.9%, Mo: 1.6 through 3.0%, Cu: 0.1 through 0.5%, Al: 0.001 through 0.02%, and N: 0.03 through 0.35% in percent by mass, limiting O to between 0.10% to greater than 0%, limiting P to between 0.03% to greater than 0%, and limiting S to between 0.005% to greater than 0%, further containing one, two, or more of Ti: 0.01 through 0.3%, Nb: 0.01 through 0.3%, Ca: 0.0005 through 0.0050%, and Mg: 0.0005 through 0.0050%, having a ratio of a Cr equivalent to Ni equivalent (Cr equivalent/Ni equivalent) within a range between about 0.85 and 1.2 defined by the following equations (6) and (7), and having a PI value of about 35 or more defined by the following equation (8), the remainder being iron and unavoidable impurities other than P, O, and S:

$$\text{PIW value} = Cr + 3.3(Mo + 0.5W) + 16N \quad (4)$$

$$\delta \text{ cal value} = 2.9(Cr + 0.3Si + Mo + 0.5W) - 2.6(Ni + 0.3Mn + 0.25Cu + 32C + 20N) - 18 \quad (5)$$

wherein the Cr, Mo, W, N, Si, Ni, Mn, Cu, and C indicate contents (percent by mass) of the respective components in the at least one steel material portion, and $$\text{Cr equivalent} = Cr + Mo + 1.5 \times Si \quad (6)$$

$$\text{Ni equivalent} = Ni + 0.5 \times Mn + 30 \times C + 30 \times N \quad (7)$$

$$\text{PI value} = Cr + 3.3 \times Mo + 16 \times N \quad (8)$$

$$Q = \text{welding current} \times \text{welding voltage} \times \text{welding time} / \text{welding length} \quad (9)$$

$$D = \text{melting volume of base metal/total weld metal volume} \quad (10)$$

wherein the Cr, Mo, Si, Mn, C, and N indicate contents (percent by mass) of the at least one weld metal portion.

15. An austenitic stainless steel welding structure comprising:
at least one austenitic stainless steel base metal portion containing, about, C: 0.005 through 0.03%, Si: 0.1 through 1.5%, Mn: 0.1 through 3.0%, Ni: 15.0 through 21.0%, Cr: 22.0 through 28.0%, Mo: 1.5 through 3.5%, N: 0.15 through 0.35%, W: between 3.0% to greater than 0%, Al: 0.005 through 0.1% to greater than 0% in percent by mass, limiting O to between 0.007% to greater than 0%, limiting P to between 0.05% to greater than 0%, and limiting S to between 0.003% to greater than 0%, having a PIW value defined by the following equation (4) within a range between about 35 and 40, and a δ cal value defined by the following equation (5) within a range between about −6 and +4, the remainder being iron and unavoidable impurities other than P, O, and S; and
at least one weld metal portion that is formed at a weld zone by using at least one of a gas shield arc welding procedure or a tungsten arc welding procedure and using a pulsed arc procedure under conditions such that a difference between a peak current and a base current is about 20 A or more, a duty ratio defined by the following equation (9) is set to about 0.2 through 0.6, and a frequency is set to about 10 Hz or more, containing, about, C: 0.005 through 0.05%, Si: 0.1 through 1.0%, Mn: 0.1 through 3.5%, Cr: 25.0 through 28.0%, Ni: 16.0 through 23.9%, Mo: 1.6 through 3.0%, Cu: 0.1 through 0.5%, Al: 0.001 through 0.02%, and N: 0.03 through 0.35% in percent by mass, limiting O to between 0.10% to greater than 0%, limiting P to between 0.03% to greater than 0%, and limiting S to between 0.005% to greater than 0%, having a ratio of a Cr equivalent to Ni equivalent (Cr equivalent/Ni equivalent) within a range between about 0.85 and 1.2 defined by the following equations (6) and (7), and having a PI value of about 35 or more defined by the following equation (8), the remainder being iron and unavoidable impurities other than P, O, and S:

$$\text{PIW value} = Cr + 3.3(Mo + 0.5W) + 16N \quad (4)$$

$$\delta \text{ cal value} = 2.9(Cr + 0.3Si + Mo + 0.5W) - 2.6(Ni + 0.31Mn + 0.25Cu + 32C + 20N) - 18 \quad (5)$$

wherein the Cr, Mo, W, N, Si, Ni, Mn, Cu, and C indicate contents (percent by mass) of the respective components in the at least one steel material portion, and $$\text{Cr equivalent} = Cr + Mo + 1.5 \times Si \quad (6)$$

$$\text{Ni equivalent} = Ni + 0.5 \times Mn + 30 \times C + 30 \times N \quad (7)$$

$$\text{PI value} = Cr + 3.3 \times Mo + 16 \times N \quad (8)$$

$$R = \text{peak current period} / (\text{peak current period} + \text{base current period}) \quad (9)$$

wherein the Cr, Mo, Si, Ni, Mn, C, and N indicate contents (percent by mass) of the at least one weld metal portion.

16. The austenitic stainless steel welding structure according to claim 8, wherein the at least one weld metal portion is formed by using pulsed arc under conditions such that a difference between a peak current and a base current is about 20 A or more, a duty ratio R defined by the following equation (10) is set to about 0.2 through 0.6, and a frequency is set to about 10 Hz or more:

$$R = \text{peak current period} / (\text{peak current period} + \text{base current period}) \quad (10).$$

17. The austenitic stainless steel welding structure according to claim 9, wherein the weld metal is formed by using pulsed arc under conditions such that a difference between a peak current and a base current is 20 A or more, a duty ratio R defined by the following equation (10) is set to about 0.2 through 0.6, and a frequency is set to about 10 Hz or more:

$$R = \text{peak current period} / (\text{peak current period} + \text{base current period}) \quad (10).$$

18. An austenitic stainless steel welding structure comprising:
at least one austenitic stainless steel base metal portion containing, about, C: 0.005 through 0.03%, Si: 0.1 through 1.5%, Mn: 0.1 through 3.0%, Ni: 15.0 through 21.0%, Cr: 22.0 through 28.0%, Mo: 1.5 through 3.5%, N: 0.15 through 0.35%, Al: 0.005 through 0.1% to greater than 0% in percent by mass, limiting O to between 0.007% to greater than 0%, limiting P to between 0.05% to greater than 0%, and limiting S to between 0.003% to greater than 0%, further containing one, two, or more of Cu: 0.1 through 2.0%, Ti: 0.003 through 0.03%, Nb: 0.02 through 0.20%, V: 0.05 through 0.5%, and W: 0.3 through 3.0%, having a PIW value defined by the following equation (4) within a range between about 35 and 40, and a δ cal value defined by the following equation (5) within a range between about −6 and +4, the remainder being iron and unavoidable impurities other than P, O, and S; and
at least one weld metal portion that is formed at a weld zone by using at least one of a gas shield arc welding procedure or a tungsten arc welding procedure and using a pulsed arc procedure under conditions such that a difference between a peak current and a base current is about 20 A or more, a duty ratio R defined by the following equation (9) is set to about 0.2 through 0.6, and a frequency is set to about 10 Hz or more, containing, about, C: 0.005 through 0.05%, Si: 0.1 through 1.0%, Mn: 0.1 through 3.5%, Cr: 25.0 through 28.0%, Ni: 16.0 through 23.9%, Mo: 1.6 through 3.0%, Cu: 0.1 through 0.5%, Al: 0.001 through 0.02%, and N: 0.03 through 0.35% in percent by mass, limiting O to between 0.10% to greater than 0%, limiting P to between 0.03% to greater than 0%, and limiting S to between 0.005% to greater than 0%, further containing one, two, or more of Ti: 0.01 through 0.3%, Nb: 0.01 through 0.3%, Ca: 0.0005 through 0.0050%, and Mg: 0.0005 through 0.0050%, having a ratio of a Cr equivalent to Ni equivalent (Cr equivalent/Ni equivalent) within a range between about 0.85 and 1.2 defined by the following equations (6) and (7), and having a PI value of about 35 or more defined by the following equation (8), the remainder being iron and unavoidable impurities other than P, O, and S:

$$\text{PIW value} = Cr + 3.3(Mo + 0.5W) + 16N \quad (4)$$

$$\delta \text{ cal value} = 2.9(Cr + 0.3Si + Mo + 0.5W) - 2.6(Ni + 0.3Mn + 0.25Cu + 32C + 20N) - 18 \quad (5)$$

wherein the Cr, Mo, W, N, Si, Mn, Cu, and C indicate contents (percent by mass) of the respective components in the at least one steel material portion, and $$\text{Cr equivalent} = Cr + Mo + 1.5 \times Si \quad (6)$$

$$\text{Ni equivalent} = +0.5 \times Mn + 30 \times C + 30 \times N \quad (7)$$

$$\text{PI value} = \text{Cr} + 3.3 \times \text{Mo} + 16 \times \text{N} \quad (8)$$

$$R = \text{peak current period}/(\text{peak current period} + \text{base current period}) \quad (9)$$

wherein the Cr, Mo, Si, Ni, Mn, C, and N indicate contents (percent by mass) of the at least one weld metal portion.

19. The austenitic stainless steel welding structure according to claim 11, wherein the least one weld metal portion is formed by using a pulsed arc procedure under conditions such that a difference between a peak current and a base current is about 20 A or more, a duty ratio R defined by the following equation (11) is set to about 0.2 through 0.6, and a frequency is set to about 10 Hz or more:

$$R = \text{peak current period}/(\text{peak current period} + \text{base current period}) \quad (11).$$

20. An austenitic stainless steel welding structure comprising:
at least one austenitic stainless steel base metal portion containing, about, C: 0.005 through 0.03%, Si: 0.1 through 1.5%, Mn: 0.1 through 3.0%, Ni: 15.0 through 21.0%, Cr: 22.0 through 28.0%, Mo: 1.5 through 3.5%, N: 0.15 through 0.35%, Al: 0.005 through 0.1% or less to greater than 0% in percent by mass, limiting O to between 0.007% to greater than 0%, limiting P to between 0.05% to greater than 0%, and limiting S to between 0.003% to greater than 0%, further containing one, two, or more of Cu: 0.1 through 2.0%, Ti: 0.003 through 0.03%, Nb: 0.02 through 0.20%, V: 0.05 through 0.5%, and W: 0.3 through 3.0%, having a PIW value defined by the following equation (4) within a range between about 35 and 40, and a δ cal value defined by the following equation (5) within a range between about −6 and +4, the remainder being iron and unavoidable impurities other than P, O, and S; and
at least one weld metal portion that is formed at a weld zone by using at least one of a gas shield arc welding procedure or a tungsten arc welding procedure and using a pulsed arc procedure under welding conditions such that a weld heat input Q defined by the following equation (9) is between about 20,000 J/cm to greater than 0, a base metal dilution ratio D defined by the following equation (10) is between about 30% to greater than 0, a difference between a peak current and a base current is about 20 A or more, a duty ratio R defined by the following equation (11) is set to about 0.2 through 0.6, and a frequency is set to 10 Hz or more, containing, about, C: 0.005 through 0.05%, Si: 0.1 through 1.0%, Mn: 0.1 through 3.5%, Cr: 25.0 through 28.0%, Ni: 16.0 through 23.9%, Mo: 1.6 through 3.0%, Cu: 0.1 through 0.5%, Al: 0.001 through 0.02%, and N: 0.03 through 0.35% in percent by mass, limiting O to between 0.10% to greater than 0%, limiting P to between 0.03% to greater than 0%, and limiting S to between 0.005% to greater than 0%, having a ratio of a Cr equivalent to Ni equivalent (Cr equivalent/Ni equivalent) within a range between 0.85 and 1.2 defined by the following equations (6) and (7), and having a PI value of 35 or more defined by the following equation (8), the remainder being iron and unavoidable impurities other than P, O, and S:

$$\text{PIW value} = \text{Cr} + 3.3(\text{Mo} + 0.5\text{W}) + 16\text{N} \quad (4)$$

$$\delta \text{ cal value} = 2.9(\text{Cr} + 0.3\text{Si} + \text{Mo} + 0.5\text{W}) - 2.6(\text{Ni} + 0.3\text{Mn} + 0.25\text{Cu} + 32\text{C} + 20\text{N}) - 18 \quad (5)$$

wherein the Cr, Mo, W, N, Si, Ni, Mn, Cu, and C indicate contents (percent by mass) of the respective components in the at least one steel material portion, and $$\text{Cr equivalent} = \text{Cr} + \text{Mo} + 1.5 \times \text{Si} \quad (6)$$

$$\text{Ni equivalent} = \text{Ni} + 0.5 \times \text{Mn} + 30 \times \text{C} + 30 \times \text{N} \quad (7)$$

$$\text{PI value} = \text{Cr} + 3.3 \times \text{Mo} + 16 \times \text{N} \quad (8)$$

$$Q = \text{welding current} \times \text{welding voltage} \times \text{welding time}/\text{welding length} \quad (9)$$

$$D = \text{melting volume of base metal}/\text{total weld metal volume} \quad (10)$$

$$R = \text{peak current period}/(\text{peak current period} + \text{base current period}) \quad (11)$$

wherein the Cr, Mo, Si, Ni, Mn, C, and N indicate contents (percent by mass) of the at least one weld metal portion.

21. An austenitic stainless steel welding structure comprising:
at least one austenitic stainless steel base metal portion containing, about, C: 0.005 through 0.03%, Si: 0.1 through 1.5%, Mn: 0.1 through 3.0%, Ni: 15.0 through 21.0%, Cr: 22.0 through 28.0%, Mo: 1.5 through 3.5%, N: 0.15 through 0.35%, W: 3.0% to greater than 0%, Al: 0.005 through 0.1% or less to greater than 0% in percent by mass, limiting O to between 0.007% to greater than 0%, limiting P to between 0.05% to greater than 0%, and limiting S to between 0.003% to greater than 0%, having a PIW value defined by the following equation (4) within a range between about 35 and 40, and a δ cal value defined by the following equation (5) within a range between about −6 and +4, the remainder being iron and unavoidable impurities other than P, O, and S; and
at least one weld metal portion that is formed at a weld zone by using at least one of a gas shield arc welding procedure or a tungsten arc welding procedure and using a pulsed arc procedure under welding conditions such that a weld heat input Q defined by the following equation (9) is between about 20,000 J/cm to greater than 0, a base metal dilution ratio D defined by the following equation (10) is about 30% (excluding 0), a difference between a peak current and a base current is about 20 A or more, a duty ratio R defined by the following equation (11) is set to about 0.2 through 0.6, and a frequency is set to about 10 Hz or more, containing, about, C: 0.005 through 0.05%, Si: 0.1 through 1.0%, Mn: 0.1 through 3.5%, Cr: 25.0 through 28.0%, Ni: 16.0 through 23.9%, Mo: 1.6 through 3.0%, Cu: 0.1 through 0.5%, Al: 0.001 through 0.02%, and N: 0.03 through 0.35% in percent by mass, limiting O to between about 0.10% to greater than 0%, limiting P to about 0.03% to greater than 0%, and limiting S to between about 0.005% to greater than 0%, further containing one, two, or more of, about, Ti: 0.01 through 0.3%, Nb: 0.01 through 0.3%, Ca: 0.0005 through 0.0050%, and Mg: 0.0005 through 0.0050%, having a ratio of a Cr equivalent to Ni equivalent (Cr equivalent/Ni equivalent) within a range between about 0.85 and 1.2 defined by the following equations (6) and (7), and having a PI value of about 35 or more defined by the following equation (8), the remainder being iron and unavoidable impurities other than P, O, and S:

$$\text{PIW value} = \text{Cr} + 3.3(\text{Mo} + 0.5\text{W}) + 16\text{N} \quad (4)$$

$$\delta \text{ cal value} = 2.9(\text{Cr} + 0.3\text{Si} + \text{Mo} + 0.5\text{W}) - 2.6(\text{Ni} + 0.3\text{Mn} + 0.25\text{Cu} + 32\text{C} + 20\text{N}) - 18 \quad (5)$$

wherein the Cr, Mo, W, N, Si, Ni, Mn, Cu, and C indicate contents (percent by mass) of the respective components in the at least one steel material portion, and $$\text{Cr equivalent} = Cr + Mo + 1.5 \times Si \quad (6)$$

$$\text{Ni equivalent} = Ni + 0.5 \times Mn + 30 \times C + 30 \times N \quad (7)$$

$$\text{PI value} = Cr + 3.3 \times Mo + 16 \times N \quad (8)$$

$$Q = \text{welding current} \times \text{welding voltage} \times \text{welding time} / \text{welding length} \quad (9)$$

$$D = \text{melting volume of base metal} / \text{total weld metal volume} \quad (10)$$

$$R = \text{peak current period} / (\text{peak current period} + \text{base current period}) \quad (11)$$

wherein the Cr, Mo, Si, Ni, Mn, C, and N indicate contents (percent by mass) of the at least one weld metal portion.

22. The austenitic stainless steel welding structure according to claim 14, wherein the at least one weld metal portion is formed by using the pulsed arc procedure under conditions such that a difference between a peak current and a base current is about 20 A or more, a duty ratio R defined by the following equation (11) is set to about 0.2 through 0.6, and a frequency is set to about 10 Hz or more:

$$R = \text{peak current period} / (\text{peak current period} + \text{base current period}) \quad (11).$$

* * * * *